United States Patent
John Wilson et al.

(10) Patent No.: US 11,129,028 B2
(45) Date of Patent: Sep. 21, 2021

(54) PRIORITIZATION FOR POTENTIAL SHARED CHANNEL TRANSMISSIONS

(71) Applicant: QUALCOMM incorporated, San Diego, CA (US)

(72) Inventors: Makesh Pravin John Wilson, San Diego, CA (US); Tao Luo, San Diego, CA (US); Alexandras Manolakos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/592,570

(22) Filed: Oct. 3, 2019

(65) Prior Publication Data
US 2020/0112860 A1    Apr. 9, 2020

(30) Foreign Application Priority Data

Oct. 5, 2018  (GR) .............................. 20180100458

(51) Int. Cl.
*H04W 16/14*    (2009.01)
*H04W 72/10*    (2009.01)
(Continued)

(52) U.S. Cl.
CPC ........... *H04W 16/14* (2013.01); *H04W 24/08* (2013.01); *H04W 72/042* (2013.01); *H04W 72/046* (2013.01); *H04W 72/10* (2013.01); *H04W 72/1263* (2013.01); *H04W 76/27* (2018.02); *H04W 80/02* (2013.01)

(58) Field of Classification Search
CPC ..... H04W 16/14; H04W 72/10; H04W 24/08; H04W 80/02; H04W 72/1263; H04W 72/042; H04W 76/27; H04W 72/046; H04W 72/1242; H04W 72/1273; H04L 5/0025; H04L 5/0005; H04L 5/0053; H04B 7/0891; H04B 7/088
See application file for complete search history.

(56) References Cited

U.S. PATENT DOCUMENTS

2019/0069285 A1*  2/2019  Chandrasekhar .... H04B 7/0695
2019/0174466 A1*  6/2019  Zhang ..................... H04L 5/005

OTHER PUBLICATIONS

Vivo, Remaining issues on simultaneous reception of DL/UL physical channels and RSs, 3GPP TSG RAN WG1 Meeting #94, Gothenburg, Sweden, Aug. 20-24, 2018, R1-1808223. (Year: 2018).*

(Continued)

*Primary Examiner* — Shailendra Kumar
(74) *Attorney, Agent, or Firm* — Holland & Hart LLP

(57) ABSTRACT

Improved methods, systems, devices, or apparatus that support prioritization for potential shared data transmissions are described. In some cases, a receiving device may identify transmission parameters for shared transmissions including a scheduled shared transmission and determine resources for a potential shared transmission. The receiving device may monitor for the shared transmission(s) based on priority rules for a shared transmission and the potential shared transmission. For instance, the receiving device may be configured to receive only one of the scheduled or potential shared transmission. In some cases, the transmitting device may consider the priority rules and determine whether to transmit or drop one or more shared transmissions.

29 Claims, 16 Drawing Sheets

(51) Int. Cl.
  *H04W 24/08* (2009.01)
  *H04W 80/02* (2009.01)
  *H04W 72/12* (2009.01)
  *H04W 72/04* (2009.01)
  *H04W 76/27* (2018.01)
  *H04L 5/00* (2006.01)
  *H04B 7/08* (2006.01)

(56) References Cited

OTHER PUBLICATIONS

Intel Corporation, Summary of simultaneous transmission and reception of channels/signals, 3GPP TSG RAN WG1 Meeting #92bis, Sanya, China, Apr. 16-20, 2018, R1-1805575. (Year: 2018).*
Intel Corporation, Simultaneous Tx and Rx of channels and RS, 3GPP TSG RAN WG1 Meeting #94, Gothenburg, Sweden, Aug. 20-24, 2018, R1-1808671 (Year: 2018).*
Intel Corporation: "Simultaneous Tx and Rx of channels and RS", 3GPP Draft, 3GPP TSG RAN WG1 Meeting #94, R1-1808671, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20, 2018- Aug. 24, 2018, Aug. 11, 2018 (Aug. 11, 2018), XP051516047, 11 Pages, Retrieved from the Internet: URL: http://www.3gpp.org/ftp/tsg5Fran/WG1%5FRL1/TSGR15F94/Docs/R1%2D1808671%2Ezip [retrieved on Aug. 11, 2018] p. 5, "PDSCH + POSCH multiplexing".
Intel Corporation: "Summary of Simultaneous Transmission and Reception of Channels/Signals", 3GPP Draft, 3GPP TSG RAN WG1 Meeting #92bis, R1-1805575, 3rd Generation Partnership Project (3GPP), Mobile Competence Centre, 650, Route Des Lucioles, F-06921 Sophia-Antipolis Cedex, France, vol. RAN WG1, No. Sanya, China; Apr. 16, 2018-Apr. 20, 2018, Apr. 19, 2018 (Aug. 19, 2018), XP051427758, pp. 1-10, Retrieved from the Internet: URL: http://www.3gpp.org/ftp/Meetings%5F3GPP%5FSYNC/RAN1/Docs/ [retrieved on Apr. 19, 2018], section 2.3, section 3.9.
International Search Report and Written Opinion—PCT/US2019/054727—ISA/EPO—dated Jan. 16, 2020.
Vivo: "Remaining Issues on Simultaneous Reception of DL/UL Physical Channels and RSs", 3GPP Draft, 3GPP TSG RAN WG1 Meeting #94, R1-1808223_Remaining Issues on Simultaneous Reception of DL/UL Physical Channels and RSs, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018 Aug. 10, 2018, XP051515608, 7 Pages, Retrieved from the Internet: URL:http://www.3gpp.org/ftp/tsg%5Fran/WG1%5FRL1/TSGR1%5F94/Docs/R1%2D1808223%2Ezip [retrieved on Aug. 10, 2018], p. 2, section 2.1.

* cited by examiner

DCI (RNTI A) 210-a     DCI (RNTI B) 210-b

PDSCH (RNTI A) 215-a     PDSCH (RNTI B) 215-b

200

PRIORITIZATION FOR POTENTIAL SHARED CHANNEL TRANSMISSIONS

CROSS REFERENCE

The present application for patent claims the benefit of Greece Provisional Patent Application No. 20180100458 by JOHN WILSON et al., entitled "PRIORITIZATION FOR POTENTIAL SHARED CHANNEL TRANSMISSIONS," filed Oct. 5, 2018, assigned to the assignee hereof, and expressly incorporated herein.

BACKGROUND

The following relates generally to wireless communications, and more specifically to prioritization for potential shared channel transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, such as those that support NR technologies, devices (e.g., UEs, base stations) may have limited transmitting and receiving capability. For example, a receiving device such as a UE receiving downlink communications (or a base station receiving uplink communications) may support the use of a single spatial beam for communication at a given time. In such cases, a UE configured to receive multiple transmissions having different spatial parameters over the same (or at least partially overlapping) time-frequency resources may be unable to receive each of the multiple signals. Further, the UE may be configured to monitor control information for a potential or future transmission which may be scheduled during the same (or at least partially overlapping) time-frequency resources as a scheduled communication, which may create challenges in determining which of the communications to receive.

SUMMARY

The described techniques relate to improved methods, systems, devices, and apparatus that support prioritization for potential shared channel or signal transmissions. In some wireless communications systems, beamforming techniques may be utilized for transmissions or receptions, and a user equipment (UE) may support communications according to various quasi co-location (QCL) (e.g., spatial) parameters. In some cases, if one antenna port associated with a reference signal is QCLed with another antenna port associated with a different reference signal, a UE may assume that the large-scale properties of a signal received from one of the antenna ports (or a channel corresponding to the antenna port) is wholly or partially identical to that of a signal received from another port. In some cases, the large-scale properties may include Doppler spread, Doppler shift, timing offset-related average delay, delay spread, average gain, etc. In some other cases, the antenna ports may not be quasi co-located, and the UE may perform independent tracking procedures for the respective antenna ports in order to estimate frequency and time offsets of the antenna ports.

In some aspects, in order to receive different signals carried over control channels (e.g., Physical Downlink Control Channel (PDCCH)) or shared channels (e.g., Physical Downlink Shared Channel (PDSCH)), the spatial parameters, time-frequency errors, or other parameters used for reception may be signaled from the base station, for example, via QCL information. Due to analog beamforming constraints at a receiving device (e.g., a UE or base station may only support one (1) spatial beam at a given time), multiple channels arriving at the same (or similar) time may not be received correctly due to being associated with a different QCL. In some cases, one or more priority rules may be specified and may be indicated to a UE from a base station, which may allow the UE to support communications (e.g., configure a receiver array) with the base station. For instance, in one example, a QCL may take precedence over another QCL based in part on the priority rules. In a second example, a communication may be dropped (either from the transmitter or receiver side) based on a priority associated with the transmissions (e.g., depending on whether the transmission is a scheduled or a potentially scheduled transmission). In a third example, the indicated priority rules may allow a UE to determine one or more error cases with regard to scheduling. In a fourth example, the UE or base station may also adapt its rate matching behavior (during transmission or reception) based on the one or more priority rules.

A method of wireless communications is described. The method may include identifying a set of transmission parameters for shared channel transmissions in a wireless communications system, identifying a shared channel transmission associated with a first set of time-frequency resources, the shared channel transmission corresponding to a first control channel associated with a first priority, determining a second set of time-frequency resources for a potential shared channel transmission corresponding to a second control channel associated with a second priority based on the set of transmission parameters, and monitoring for the shared channel transmission over the first set of time-frequency resources or the potential shared channel transmission over the second set of time-frequency resources based on a set of priority rules for the first priority and the second priority.

An apparatus for wireless communications is described. The apparatus may include a processor, memory in electronic communication with the processor, and instructions stored in the memory. The instructions may be executable by the processor to cause the apparatus to identify a set of transmission parameters for shared channel transmissions in a wireless communications system, identify a shared channel transmission associated with a first set of time-frequency resources, the shared channel transmission corresponding to a first control channel associated with a first priority, determine a second set of time-frequency resources for a potential shared channel transmission corresponding to a second control channel associated with a second priority based on the set of transmission parameters, and monitor for the shared channel transmission over the first set of time-frequency resources or the potential shared channel transmission over the second set of time-frequency resources based on a set of priority rules for the first priority and the second priority.

Another apparatus for wireless communications is described. The apparatus may include means for identifying a set of transmission parameters for shared channel transmissions in a wireless communications system, identifying a shared channel transmission associated with a first set of time-frequency resources, the shared channel transmission corresponding to a first control channel associated with a first priority, determining a second set of time-frequency resources for a potential shared channel transmission corresponding to a second control channel associated with a second priority based on the set of transmission parameters, and monitoring for the shared channel transmission over the first set of time-frequency resources or the potential shared channel transmission over the second set of time-frequency resources based on a set of priority rules for the first priority and the second priority.

A non-transitory computer-readable medium storing code for wireless communications is described. The code may include instructions executable by a processor to identify a set of transmission parameters for shared channel transmissions in a wireless communications system, identify a shared channel transmission associated with a first set of time-frequency resources, the shared channel transmission corresponding to a first control channel associated with a first priority, determine a second set of time-frequency resources for a potential shared channel transmission corresponding to a second control channel associated with a second priority based on the set of transmission parameters, and monitor for the shared channel transmission over the first set of time-frequency resources or the potential shared channel transmission over the second set of time-frequency resources based on a set of priority rules for the first priority and the second priority.

Some examples of the method, apparatuses, and non-transitory computer-readable medium described herein may further include operations, features, means, or instructions for determining a set of resource allocation schemes and a set of spatial transmission parameters for shared channel transmissions based on the set of transmission parameters.

Some examples of the method, apparatuses, and non-transitory computer-readable medium described herein may further include operations, features, means, or instructions for determining a first set of spatial transmission parameters for the shared channel transmission based on the set of resource allocation schemes, determining a second set of spatial transmission parameters for the potential shared channel transmission based on the set of resource allocation schemes and monitoring for the shared channel transmission over the first set of time-frequency resources or the potential shared channel transmission over the second set of time-frequency resources based on the first and second sets of spatial transmission parameters.

Some examples of the method, apparatuses, and non-transitory computer-readable medium described herein may further include operations, features, means, or instructions for determining that the first and second sets of spatial transmission parameters may be different and monitoring for one of the shared channel transmission or the potential shared channel transmission based on determining that the first and second sets of spatial transmission parameters may be different.

In some examples of the method, apparatuses, and non-transitory computer-readable medium described herein, the first and second sets of time-frequency resources may be at least partially overlapping.

In some examples of the method, apparatuses, and non-transitory computer-readable medium described herein, identifying the shared channel transmission may include operations, features, means, or instructions for receiving control information indicating information for scheduling the shared channel transmission.

Some examples of the method, apparatuses, and non-transitory computer-readable medium described herein may further include operations, features, means, or instructions for monitoring for the potential shared channel transmission over the second set of time-frequency resources, where the second priority may be higher than the first priority.

Some examples of the method, apparatuses, and non-transitory computer-readable medium described herein may further include operations, features, means, or instructions for monitoring for the shared channel transmission over the first set of time-frequency resources, where the first priority may be higher than the second priority.

Some examples of the method, apparatuses, and non-transitory computer-readable medium described herein may further include operations, features, means, or instructions for monitoring for both the shared channel transmission over the first set of time-frequency resources and the potential shared channel transmission over the second set of time-frequency resources based on a rate-matching scheme for the first priority and the second priority indicated by the set of priority rules.

Some examples of the method, apparatuses, and non-transitory computer-readable medium described herein may further include operations, features, means, or instructions for monitoring for one of the shared channel transmission over the first set of time-frequency resources or the potential shared channel transmission over the second set of time-frequency resources based on an error classification of the shared channel transmission or the potential shared channel transmission.

In some examples of the method, apparatuses, and non-transitory computer-readable medium described herein, the first priority of the shared channel transmission may be associated with a first traffic type or a first channel type based on the set of priority rules and the second priority of the potential shared channel transmission may be associated with a second traffic type or a second channel type based on the set of priority rules.

In some examples of the method, apparatuses, and non-transitory computer-readable medium described herein, the shared channel transmission includes a second potential shared channel transmission.

Some examples of the method, apparatuses, and non-transitory computer-readable medium described herein may further include operations, features, means, or instructions for receiving, from a base station, an indication of the set of priority rules via radio resource control (RRC) signaling, downlink control information (DCI), or a media access control control element (MAC-CE).

Some examples of the method, apparatuses, and non-transitory computer-readable medium described herein may further include operations, features, means, or instructions for transmitting, to a UE, an indication of the set of priority rules via RRC signaling, DCI, or a MAC-CE.

Some examples of the method, apparatuses, and non-transitory computer-readable medium described herein may further include operations, features, means, or instructions for receiving, from a base station, an indication of a set of resource allocation schemes and a set of spatial transmission parameters for shared channel transmissions.

Some examples of the method, apparatuses, and non-transitory computer-readable medium described herein may further include operations, features, means, or instructions for transmitting, to a UE, an indication of a set of resource allocation schemes and a set of spatial transmission parameters for shared channel transmissions.

In some examples of the method, apparatuses, and non-transitory computer-readable medium described herein, the shared channel transmission, the potential shared channel transmission, or any combination thereof includes a data transmission.

A method of wireless communications is described. The method may include identifying a set of transmission parameters for shared channel transmissions in a wireless communications system, identifying a shared channel transmission associated with a first set of time-frequency resources, the shared channel transmission corresponding to a first control channel associated with a first priority, determining a second set of time-frequency resources for a potential shared channel transmission corresponding to a second control channel associated with a second priority based on the set of transmission parameters, and transmitting at least one of the shared channel transmission over the first set of time-frequency resources or the potential shared channel transmission over the second set of time-frequency resources based on a set of priority rules for the first priority and the second priority.

An apparatus for wireless communications is described. The apparatus may include a processor, memory in electronic communication with the processor, and instructions stored in the memory. The instructions may be executable by the processor to cause the apparatus to identify a set of transmission parameters for shared channel transmissions in a wireless communications system, identify a shared channel transmission associated with a first set of time-frequency resources, the shared channel transmission corresponding to a first control channel associated with a first priority, determine a second set of time-frequency resources for a potential shared channel transmission corresponding to a second control channel associated with a second priority based on the set of transmission parameters, and transmit at least one of the shared channel transmission over the first set of time-frequency resources or the potential shared channel transmission over the second set of time-frequency resources based on a set of priority rules for the first priority and the second priority.

Another apparatus for wireless communications is described. The apparatus may include means for identifying a set of transmission parameters for shared channel transmissions in a wireless communications system, identifying a shared channel transmission associated with a first set of time-frequency resources, the shared channel transmission corresponding to a first control channel associated with a first priority, determining a second set of time-frequency resources for a potential shared channel transmission corresponding to a second control channel associated with a second priority based on the set of transmission parameters, and transmitting at least one of the shared channel transmission over the first set of time-frequency resources or the potential shared channel transmission over the second set of time-frequency resources based on a set of priority rules for the first priority and the second priority.

A non-transitory computer-readable medium storing code for wireless communications is described. The code may include instructions executable by a processor to identify a set of transmission parameters for shared channel transmissions in a wireless communications system, identify a shared channel transmission associated with a first set of time-frequency resources, the shared channel transmission corresponding to a first control channel associated with a first priority, determine a second set of time-frequency resources for a potential shared channel transmission corresponding to a second control channel associated with a second priority based on the set of transmission parameters, and transmit at least one of the shared channel transmission over the first set of time-frequency resources or the potential shared channel transmission over the second set of time-frequency resources based on a set of priority rules for the first priority and the second priority.

Some examples of the method, apparatuses, and non-transitory computer-readable medium described herein may further include operations, features, means, or instructions for determining a set of resource allocation schemes and a set of spatial transmission parameters for shared channel transmissions based on the set of transmission parameters.

Some examples of the method, apparatuses, and non-transitory computer-readable medium described herein may further include operations, features, means, or instructions for determining a first set of spatial transmission parameters for the shared channel transmission based on the set of resource allocation schemes, determining a second set of spatial transmission parameters for the potential shared channel transmission based on the set of resource allocation schemes and transmitting at least one of the shared channel transmission over the first set of time-frequency resources or the potential shared channel transmission over the second set of time-frequency resources based on the first and second sets of spatial transmission parameters.

Some examples of the method, apparatuses, and non-transitory computer-readable medium described herein may further include operations, features, means, or instructions for receiving control information indicating information for scheduling the shared channel transmission.

Some examples of the method, apparatuses, and non-transitory computer-readable medium described herein may further include operations, features, means, or instructions for transmitting the potential shared channel transmission over the second set of time-frequency resources, where the second priority may be higher than the first priority.

Some examples of the method, apparatuses, and non-transitory computer-readable medium described herein may further include operations, features, means, or instructions for dropping the shared channel transmission based on transmitting the potential shared channel transmission.

Some examples of the method, apparatuses, and non-transitory computer-readable medium described herein may further include operations, features, means, or instructions for transmitting the shared channel transmission over the first set of time-frequency resources, where the first priority may be higher than the second priority.

Some examples of the method, apparatuses, and non-transitory computer-readable medium described herein may further include operations, features, means, or instructions for dropping the potential shared channel transmission based on transmitting the shared channel transmission.

Some examples of the method, apparatuses, and non-transitory computer-readable medium described herein may further include operations, features, means, or instructions for transmitting both the shared channel transmission over the first set of time-frequency resources and the potential shared channel transmission over the second set of time-frequency resources based on a rate-matching scheme for the first priority and the second priority indicated by the set of priority rules.

In some examples of the method, apparatuses, and non-transitory computer-readable medium described herein, the first priority of the shared channel transmission may be associated with a first traffic type or a first channel type based on the set of priority rules and the second priority of the potential shared channel transmission may be associated with a second traffic type or a second channel type based on the set of priority rules.

In some examples of the method, apparatuses, and non-transitory computer-readable medium described herein, the shared channel transmission includes a second potential shared channel transmission.

Some examples of the method, apparatuses, and non-transitory computer-readable medium described herein may further include operations, features, means, or instructions for receiving, from a base station, an indication of the set of priority rules via RRC signaling, DCI, or a MAC-CE.

Some examples of the method, apparatuses, and non-transitory computer-readable medium described herein may further include operations, features, means, or instructions for transmitting, to a UE, an indication of the set of priority rules via RRC signaling, DCI, or a MAC-CE.

Some examples of the method, apparatuses, and non-transitory computer-readable medium described herein may further include operations, features, means, or instructions for receiving, from a base station, an indication of a set of resource allocation schemes and a set of spatial transmission parameters for shared channel transmissions.

Some examples of the method, apparatuses, and non-transitory computer-readable medium described herein may further include operations, features, means, or instructions for transmitting, to a UE, an indication of a set of resource allocation schemes and a set of spatial transmission parameters for shared channel transmissions.

In some examples of the method, apparatuses, and non-transitory computer-readable medium described herein, the shared channel transmission, the potential shared channel transmission, or any combination thereof includes a data transmission.

DETAILED DESCRIPTION

Figure 1:
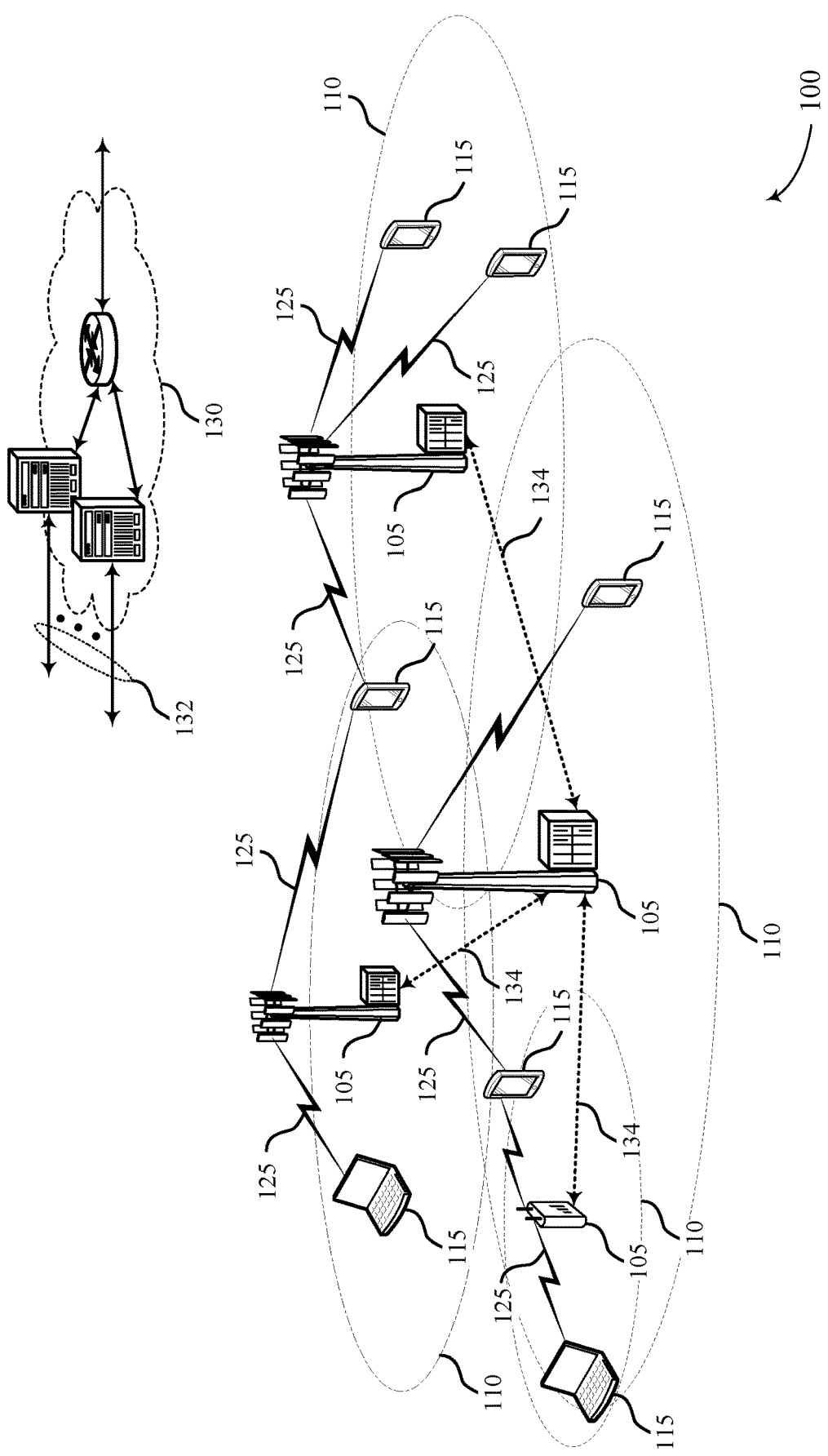
FIG. 1 illustrates an example of a wireless communications system that supports prioritization for potential shared channel transmissions in accordance with aspects of the present disclosure.

In some wireless communications systems, the antennas of a base station or user equipment (UE) may be located within one or more antenna arrays, and may support beamforming for transmissions or receptions, as well as multiple input multiple output (MIMO) operations. In some cases, data streams may be mapped to antennas using antenna ports. Specifically, an antenna port may be a logical entity used to map data streams to antennas. A given antenna port may drive transmissions from one or more antennas and resolve signal components received over one or more antennas. Each antenna port may be associated with a reference signal (e.g., which may allow the receiver to distinguish data streams associated with the different antenna ports in a received transmission). In some cases, some antenna ports may be referred to as quasi co-located (QCLed), meaning that the spatial parameters, timing/frequency errors, or one or more other parameters associated with transmissions (or receptions) on one antenna port may be inferred from the parameters associated with another transmission (or reception) on a different antenna port. Similarly, reference signals (e.g., transmitted on an antenna port) may be referred to as QCL such that the spatial parameters associated with one reference signal may be inferred from the spatial parameters associated with another reference signal.

In some aspects, if one antenna port is quasi co-located with another antenna port, a UE may assume that the large-scale properties of a signal received from one of the antenna ports (or a channel corresponding to the antenna port) is wholly or partially identical to that of a signal received from another port. In some cases, the large-scale properties may include Doppler spread, Doppler shift, timing offset-related average delay, delay spread, average gain, etc. In some other cases, the antenna ports may not be QCLed, and receiver or transmitter may perform independent tracking procedures for the respective antenna ports in order to estimate frequency and time offsets of the antenna ports. In some cases, a receiver such as a UE may receive an indication of QCL information for downlink or uplink transmissions with a particular reference signal (e.g., Demodulation Reference Signal (DMRS), channel state information reference signal (CSI-RS), cell-specific reference signal (CRS), etc.). For instance, the UE may receive an indication that a physical downlink control channel (PDCCH) with DMRS is QCLed with a CSI-RS with respect to one or more parameters (QCL type A, QCL type D, etc.). In such cases, the UE may estimate one or more parameters for the antenna port, signal, or channel. The UE may then apply the estimates of the PDCCH corresponding to an antenna port, for example, in a power-delay profile, delay spread, Doppler spectrum, or Doppler spread to determine a filter coefficient or parameter (e.g., for a filter, such as a Wiener filter), which may be used for channel estimation of the downlink channel corresponding to another antenna port quasi co-located with the antenna port. Hence, the UE may utilize QCL information associated with antenna ports, reference signals, as well as other signals for channel estimations, as well as demodulating the data.

In some cases, a base station may transmit an indication of a QCL configuration or information to a UE that may indicate the groups of antenna ports that are QCLed and a QCL type associated with the configuration. Multiple channels such as physical downlink shared channel (PDSCH) or PDCCH may be multiplexed in the frequency domain, which may be referred to as frequency division multiplexing (FDM). In some cases, a UE's reception unit may be limited based in part on an analog beamforming constraint (e.g., only 1 spatial beam may be supported at a given time). In such cases, if multiple channels are to be received at the same (or similar) time, and if each channel has a different spatial QCL, the UE may be unable to receive the signals carried over the channels.

In some aspects, one or more priority rules may be specified and may be indicated to the UE by a base station, which may allow the UE to optimize its communications with the base station. In one example, and based in part on the priority rules, a QCL may take precedence over another. In a second example, a communication may be dropped. In a third example, the indicated priority rules may allow a UE to determine one or more error cases with regards to scheduling. Lastly, in a fourth example, the UE may adapt its rate matching behavior based on the one or more priority rules.

The priority rules may be defined for shared channel or shared signal transmissions (e.g., a shared data transmission(s), reference signal transmission(s), broadcast or multicast signaling) or potential shared channel or signal transmissions (e.g., shared transmissions that may be scheduled in the future) being transmitted from a transmitting device to a receiving device. In uplink, a base station may consider the priority rules when receiving transmissions from the UE and in downlink, the base station may consider the priority rules when transmitting to the UE. From the UE perspective, the UE may consider the priority rules when receiving transmissions from the base station in downlink, and the UE may consider the priority rules when transmitting to the base station in uplink.

Aspects of the disclosure are initially described in the context of wireless communications systems. Aspects are also described with respect to resource grids and a process flow. Aspects of the disclosure are further illustrated by and described with reference to apparatus diagrams, system diagrams, and flowcharts that relate to prioritization for potential shared channel transmissions.

FIG. 1 illustrates an example of a wireless communications system 100 that supports prioritization for potential shared channel transmissions in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, MIMO communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related.

The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115 that can support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A receiving device (e.g., a UE 115 receiving downlink transmissions from a base station 105 or a base station 105 receiving uplink transmissions from a UE 115) may operate according to priority rules for shared channel or shared signal transmissions (e.g., a shared data transmission, control information transmitted via a shared channel, reference signals, or other signals). For instance, the receiving device may determine resources that may be allocated for a potential transmission (e.g., a transmission that may occur or may be scheduled at a later time). The resources for the potential transmission may be based on a resource allocation scheme such as a table that indicates time (or frequency) resource allocations for shared transmissions. The table may indicate resource allocations based on mapping type or may identify symbols (e.g., starting symbol, end symbol, total length) that may be used for allocation of shared transmissions.

Based on the determined resources, the receiving device may monitor for one or more of a first (e.g., scheduled) shared transmission or a second (e.g., potential) shared transmission. The receiving device may monitor, based on QCL information, for each of the first and second shared transmissions. For instance, if the first and second shared transmissions have different spatial parameters, the receiving device may choose to monitor for only one of the shared transmissions based on priorities associated with each of the shared transmissions. In some cases, the receiving device may monitor for both the first and second shared transmissions according to rate-matching scheme, which may be specified by the priority rules.

A transmitting device (e.g., a UE 115 transmitting uplink transmissions to a base station 105 or a base station 105 transmitting downlink transmissions to a UE 115) may also consider the priority rules when determining whether to transmit a first or a second shared transmission. For instance, the transmitting device may decide to drop one of the first or the second shared transmissions based on the priority rules.

Different channel types or information being transmitted may be associated with different priorities and an indication of the priority rules, resource allocation schemes, or spatial parameters may be indicated to the receiving device (e.g., transmitted from a transmitting device).

Figure 2:
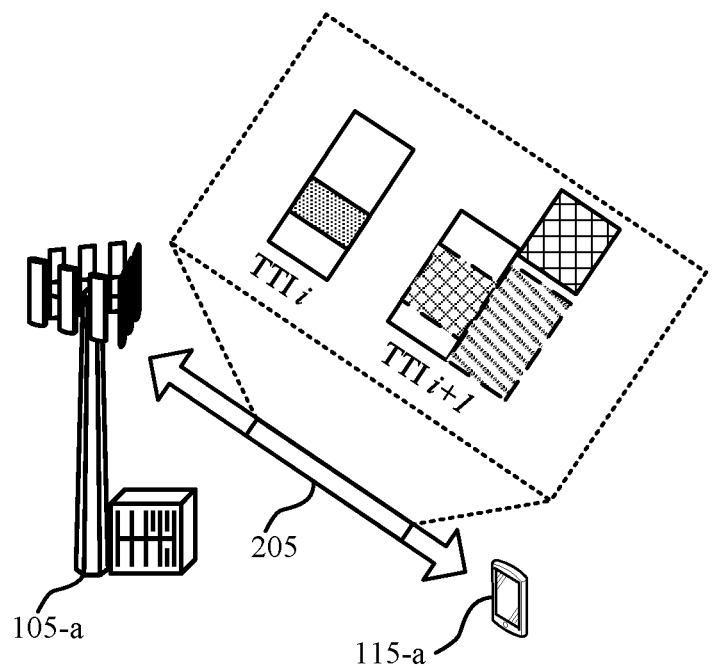
FIG. 2 illustrates an example of a wireless communications system that supports prioritization for potential shared channel transmissions in accordance with aspects of the present disclosure.
Figure 2:
Figure 2:
Figure 2:
Figure 2:

FIG. 2 illustrates an example of a wireless communications system 200 that supports prioritization for potential shared channel or shared signal transmissions in accordance with aspects of the present disclosure. In some examples, wireless communications system 200 may implement aspects of wireless communications system 100. As shown, wireless communications system 200 includes a base station 105-a and a UE 115-a, which may be examples of the corresponding devices described with reference to FIG. 1. In some cases, UE 115-a and base station 105-a may communicate using communication link 205, and may operate in mmW spectrum or using NR technologies. In some cases, UE 115-a and base station 105-a may also communicate using beamforming techniques or may utilize MIMO operations.

In some cases, in wireless communications system 200, data streams transmitted from the base station 105-a may be mapped to antennas using antenna ports. An antenna port may be a logical entity used to map data streams to antennas. A given antenna port may drive transmissions from one or more antennas and resolve signal components received over one or more antennas. Each antenna port may be associated with a reference signal (e.g., which may allow the receiver to distinguish data streams associated with the different antenna ports in a received transmission). In some cases, some antenna ports may be referred to as QCLed.

In some cases, a receiving device (e.g., UE 115-a in one example) may receive an indication of QCL information for downlink or uplink transmissions (e.g., associated with a particular reference signal such as a Synchronization Signal Block (SSB), DMRS, CSI-RS, CRS) For instance, the UE 115-a may receive an indication that a PDCCH with DMRS is QCLed with a CSI-RS with respect to one or more parameters (e.g., QCL type A). In such cases, the UE 115-a may estimate one or more parameters for the antenna port, signal, or channel. The UE 115-a may then apply the estimates of the PDCCH corresponding to an antenna port, for example, in a power-delay profile, delay spread, Doppler spectrum, or Doppler spread to determine a filter coefficient or parameter (for a filter, such as a Wiener filter), which may be used for channel estimation of the downlink channel corresponding to another antenna port quasi co-located with the antenna port. Hence, the UE 115-a may utilize QCL information associated with antenna ports, reference signals, as well as other signals for channel estimations, as well as demodulating the data.

In some cases, a transmitting device (e.g., a base station 105-a in one example) may transmit an indication of a QCL configuration or information to the UE 115-a, that may indicate the groups of antenna ports that are quasi co-located and a QCL type associated with the configuration. For type A QCL of two sets of antenna ports, the UE 115-a may be able to determine a Doppler shift, Doppler spread, average delay, and a delay spread associated with a transmission on one set of antenna ports based on signals received on another set of antenna ports. For type B QCL of two sets of antenna ports, the UE 115-a may be able to determine a Doppler shift and a Doppler spread associated with a transmission on one set of antenna ports based on signals received on another set of antenna ports. For type C QCL of two sets of antenna ports, the UE 115-a may be able to determine an average delay and a Doppler shift associated with a transmission on one set of antenna ports based on signals received on another set of antenna ports. For type D QCL of two sets of antenna ports, the UE 115-a may be able to determine spatial receive parameters associated with a transmission on one set of antenna ports based on signals received on another set of antenna ports.

In some cases, multiple channels such as PDSCH, PDCCH, physical uplink shared channel (PUSCH), or physical uplink control channel (PUCCH) may be multiplexed in the frequency domain. In some cases, receiving device may be limited based on an analog beamforming constraint (e.g., only 1 spatial beam may be supported at a given time). In such cases, if a multiple channels are to be received at the same (or similar) time, and if each channel has a different spatial QCL, the receiving device may be unable to receive the signals carried over the channels.

As illustrated in FIG. 2, a downlink control information (DCI) 210-a associated with radio network temporary identifier (RNTI) A may be used to schedule a first PDSCH 215-a, also associated with RNTI A. For instance, the DCI 210-a may arrive in a first TTI and the first PDSCH 215-a may be scheduled to arrive in a second, subsequent TTI i+1. Further, the UE 115-a may be configured to monitor control resources (e.g., a control resource set) for a second (potential) DCI 210-b in the second TTI i+1. In some cases, the first or the second TTI may be a subframe, slot, mini-slot, symbol etc. The second DCI 210-b may be scrambled with a different RNTI (e.g., RNTI B). In some aspects, the second DCI 210-b may also be used to schedule a second PDSCH 215-b associated with RNTI B, which may be associated with one or more potential time domain configurations. In one example, the second PDSCH 215-b associated with RNTI B may be scheduled for the second TTI i+1, and may or may not overlap in frequency or time with the first PDSCH 215-a associated with RNTI A. In some cases, the second PDSCH 215-b or the first PDSCH 215-a may be associated with different priorities (e.g., one may have a higher priority than the other), and a set of priority rules for multiplexing or transmitting the first and second PDSCH may be determined by a transmitting device (e.g., base station 105-a).

Prior to receiving the first PDSCH 215-a or the second PDSCH 215-b, the UE 115-a may create a signal-channel map for the second PDSCH 215-b, and may compare with a signal-channel map for the first PDSCH 215-a. In some cases, the comparison may be based on one or more priority rules, and applying the priority rule may include dropping (e.g., not monitoring for or not transmitting) one of the first PDSCH 215-a or the second PDSCH 215-b. In some examples, the QCL configuration or type for the first PDSCH 215-a associated with RNTI A or the second PDSCH 215-b associated with RNTI X (or vice versa) may be obtained in order to determine which shared transmission to receive. A rate matching behavior for reception or transmission may also be defined based on the priority rules or the first PDSCH 215-a associated with RNTI A or the second PDSCH 215-b associated with RNTI X may be classified as an error case. In some cases, obtaining the QCL configuration or type may include utilizing aspects (or assumptions) of large-scale signal properties and parameters of the first PDSCH 215-a corresponding to an antenna port (e.g., CSI-RS antenna port) in channel estimation of the PDCCH carrying second DCI 210-b, and corresponding to a different port, such as a DMRS port.

Figure 3:
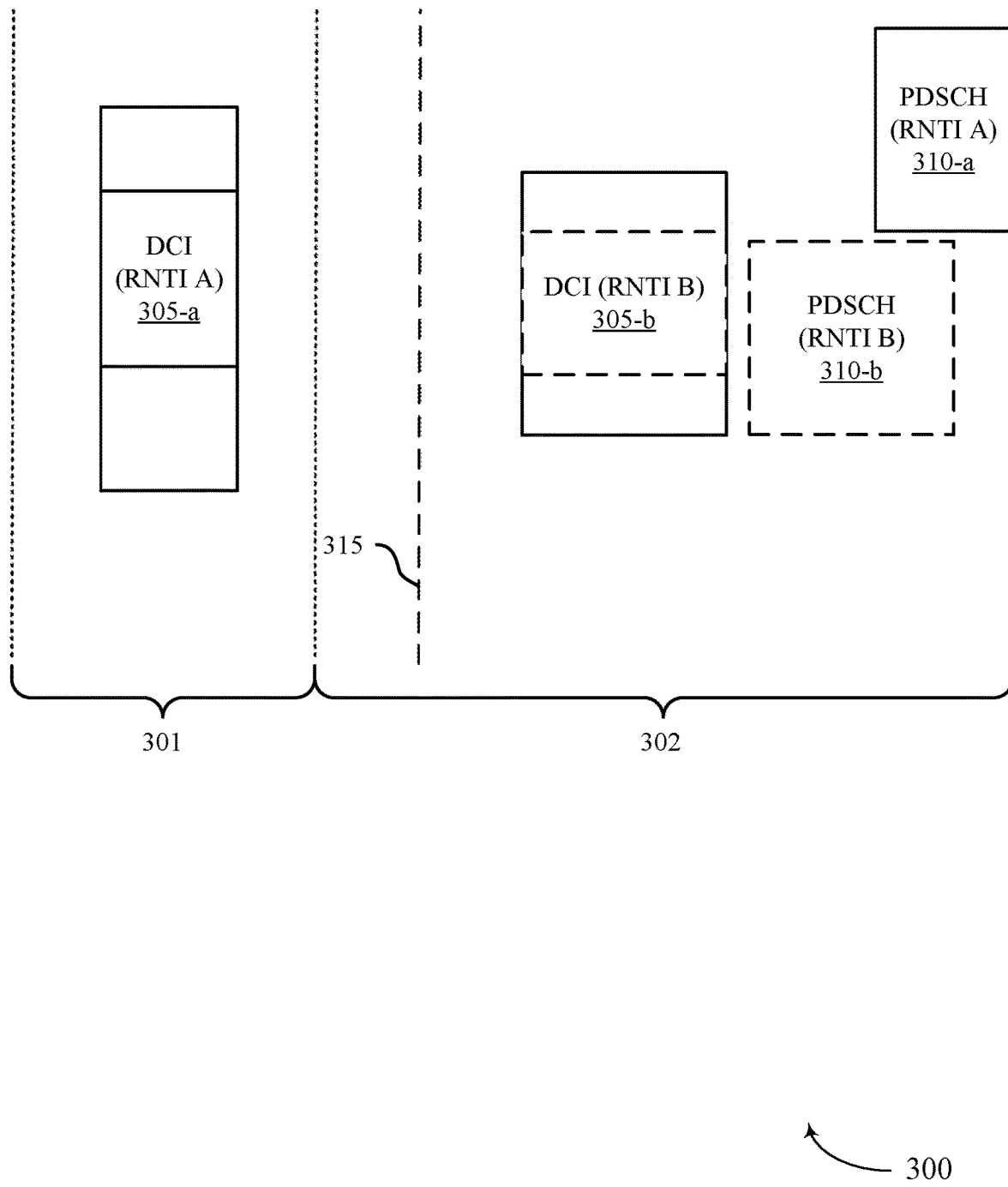
FIG. 3 illustrates an example of a resource grid that supports prioritization for potential shared channel transmissions in accordance with aspects of the present disclosure.

FIG. 3 illustrates an example of a resource grid 300 that supports prioritization for potential shared channel or shared signal transmissions in accordance with aspects of the present disclosure. In some examples, resource grid 300 may implement aspects of wireless communications systems 100 or 200. As shown, resource grid 300 illustrates various scheduled and potential resource allocations for a receiving device (e.g., UE or base station) in communication with a transmitting device (e.g., UE or base station).

In some cases, a base station may transmit control information to a UE or a group of UEs on the downlink. The UEs may be configured to monitor a control channel or a portion of a control channel for DCI to support communications with the base station. In some cases, the UE may be configured to monitor a control channel within a bandwidth part (BWP), and the operating bandwidth of a UE may be flexibly and dynamically configured through deployment of the BWP. In some cases, a UE may not transmit or receive outside of the configured frequency range of the active BWP, which may reduce power consumption at its receiver unit. In some cases, a BWP may consist of a group of contiguous physical resource blocks (PRBs) selected from a contiguous subset of common resource blocks on a given carrier. In some aspects, reserved resources may be configured within the BWP, and each BWP may be associated with its own numerology (e.g., subcarrier spacing or cyclic prefix length). In some circumstances, an initial BWP may be signaled via a Physical Broadcast Channel (PBCH). Further, the initial BWP may contain a control resource set (CORESET) and PDSCH for Remaining Minimum System Information (RMSI).

In the example shown in FIG. 3, a UE may identify a search space configuration, and may monitor the control channel elements (CCEs) corresponding to one or more hashed control channel candidates for DCI 305-a associated with a RNTI (e.g., RNTI A) from the base station. In some cases, DCI 305-*a* may be used to schedule a first data transmission over PDSCH 310-*a*, also associated with RNTI A. As illustrated, the DCI 305-*a* associated with RNTI A may arrive in a first TTI 301, and PDSCH 310-*a* may be scheduled to arrive in a second TTI 302, which may be subsequent to the first TTI 301.

Further, the UE may be configured to monitor CCEs of a CORESET for a second DCI 305-*b* in the second TTI 302. In some cases, the second DCI may be scrambled with a different RNTI (e.g., RNTI B), and may be used to schedule PDSCH 310-*b* (e.g., potential shared transmission associated with RNTI B), which may be associated with one or more potential time domain configurations. In one example, the PDSCH 310-*b* associated with RNTI B may be scheduled for the second TTI 302, and may or may not overlap in frequency-time with the PDSCH 310-*a* associated with RNTI A.

In some cases, the PDSCH 310-*b* may have a higher priority than the PDSCH 310-*a*, and a priority rule for communication of the first and second PDSCH may be defined (e.g., by the base station or core network node). Additionally or alternatively, prior to threshold 315 time (based on receiving device capabilities), as well as receiving the PDSCH, the UE may create a signal-channel map for the PDSCH 310-*b*, and may compare with a signal-channel map for the PDSCH 310-*a*.

In some cases, the comparison may be based on one or more priority rules, and applying the priority rule may include dropping the PDSCH with RNTI A or RNTI B, obtaining the QCL configuration or type for the first PDSCH associated with RNTI A for the second PDSCH associated with RNTI B (or vice versa), defining a rate matching behavior for reception of the PDSCH or PDCCH, or classifying one of the potential or scheduled PDSCH as an error case. In some cases, the threshold 315 may be based in part on the UE capability (e.g., processing, beamforming, retuning, etc.), and may signify an instance in time prior to which the UE applies the priority rules. In some cases, the threshold 315 may be associated with zero, or one or more symbols in order to adequately prepare the UE for receiving the transmissions.

In some cases, RNTI B and RNTI A may be examples of a system information (SI) RNTI (SI-RNTI) and Cell RNTI (C-RNTI), respectively. In some cases, the SI-RNTI may be associated with a higher priority broadcast transmission, such as an SI transmission, whereas the C-RNTI may be associated with a unicast transmission of a lower priority. In such cases, it may be critical to receive the PDCCH carrying DCI 305-*n* and PDSCH 310-*b* carrying the SI. In some circumstances, the PDSCH 310-*b* associated with the SI-RNTI may potentially collide (or overlap) with the unicast PDSCH (not shown). Thus, in some cases, one or more priority rules may be defined for appropriately receiving the one or more of the transmissions.

In another example, the RNTI B may be associated with ultra-reliable low-latency communication (URLLC) traffic, and the PDSCH 310-*b* and PDCCH associated with the RNTI B may take precedence over the PDSCH 310-*a* with RNTI A. In such cases, for the URLLC PDSCH, a set of potential PDSCH locations may be configured for specifying the rate-matching behavior. For instance, the UE may define or configure the rate-matching for reception of the URLLC PDSCH with respect to the set of potential (e.g., not yet scheduled) PDSCH locations.

Figure 4:
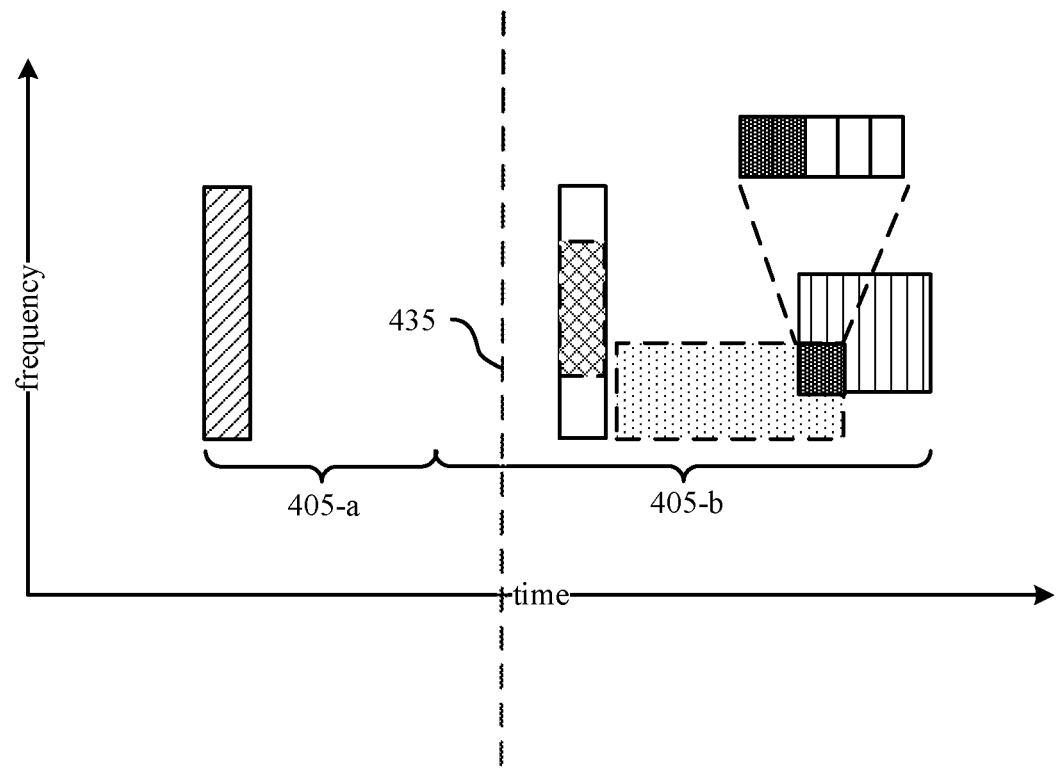
FIG. 4 illustrates an example of a resource grid that supports prioritization for potential shared channel transmissions in accordance with aspects of the present disclosure.

FIG. 4 illustrates an example of a resource grid 400 that supports prioritization for potential shared channel or shared signal transmissions in accordance with aspects of the present disclosure. In some examples, resource grid 400 may implement aspects of wireless communications systems 100 or 200. As shown, resource grid 400 illustrates various scheduled and potential resource allocations for a UE 115 in communication with a base station 105. In some cases, UE 115 and base station 105 may communicate in mmW spectrum or using NR technologies. In some cases, UE 115 and base station 105 may also communicate using beamforming techniques or MIMO.

As shown in FIG. 4, a UE may identify a search space configuration, and may monitor the CCEs corresponding to one or more hashed control channel candidates of a control channel 410 associated with a RNTI (e.g., RNTI A) from the base station. In some cases, the control channel 410 may carry DCI, which may be used to schedule a first data transmission over shared channel 420, also associated with RNTI A. As illustrated, the control channel 410 associated with RNTI A may arrive in a first TTI 405-*a*, and shared channel 420 may be scheduled to arrive in a second TTI 405-*b*, which may be subsequent to the first TTI 405-*a*. In some other cases, the control channel 410 may be an example of an uplink control channel (e.g., PUCCH), and may be used to carry uplink control information (UCI) from the UE to the base station.

Additionally or alternatively, the UE may be configured to monitor CCEs of a control channel 415 in the second TTI 405-*b*. In some cases, the second DCI obtained from the control channel 415 may be scrambled with a different RNTI (e.g., RNTI B), and may be used for potentially scheduling shared channel 425 (associated with RNTI B). It should be noted that the control channel 415 may be an example of a PUCCH, and may carry UCI. Further, the shared channels 420 and 425 may be examples of uplink shared channels, such as PUSCH.

In the example shown, the shared channel 425 associated with RNTI B may be scheduled for the second TTI 405-*b*, and overlap in frequency-time with the shared channel 420. In such cases, prior to receiving or transmitting the shared channels, the UE may create a signal-channel map in time-frequency domain for the potential shared channel (e.g., shared channel 425). Further, the UE may compare the map for the shared channel 425 with a signal channel-map for the scheduled shared channel (e.g., shared channel 420).

In some cases, the map for the shared channel 425 may include a set of one or more potential shared resource allocations for transmitting shared channel 425. In some cases, the time-frequency resources spanned by the set of potential shared resource allocations may be different than the time-frequency resources that may ultimately be used for the shared channel 425. In some cases, a set of priority rules may be established or determined at the UE for receiving the shared channels, based in part on a potential shared channel or shared signal transmission overlapping with a scheduled channel transmission, where the two channels may have a different QCL (e.g., a spatial QCL, QCL type A or D). In some cases, the UE may apply the one or more QCL priority rules before a threshold 435. The threshold 435 may be based in part on the UE capability (e.g., processing, beamforming, retuning, etc.), and may signify an instance in time prior to which the UE applies the priority rules. In some cases, the threshold 435 may be associated with zero symbols, or one or more symbols in order to adequately prepare the UE for receiving the transmissions.

In some cases, the UE may receive a QCL configuration (or QCL information) from the base station for the different channels and antenna ports, and may proceed to use a common set of parameters of QCL type D associated with shared channel 420 for reception of shared channel 425. In some cases, the UE may continue using different parameters of the other QCL types for receiving the shared channels. In some examples, the UE may drop a portion (or all) of the shared channel or shared signal transmission associated with a certain RNTI, by puncturing one or more symbols (e.g., punctured symbols 430). In the example shown, punctured symbols 430 may be dropped from shared channel 420 or shared channel 425, and may be based in part on the priority associated with the shared channels (e.g., URLLC traffic in shared channel 425 may be prioritized over non-URLLC traffic in shared channel 420).

In some other cases, the base station may determine that the potential shared channel or shared signal transmission and the scheduled shared channel or shared signal transmission may have a different spatial QCL, and may be received by the UE at the same time. In such cases, the base station may readjust the location of the potential or scheduled shared channel or shared signal transmission, or may drop one of the transmissions.

In some examples, priority rules may be defined entirely on signal-channel maps for potential transmissions. For instance, one or more priority rules may be defined between a potential transmission A with a first signal-channel map, and a different, potential transmission B with another signal-channel map. In some cases, the potential signal/resource allocations for these transmissions may be signaled via one or more of RRC signaling, DCI, or a MAC Control Element (MAC-CE).

Base on the priority scheme, a transmitting device (e.g., a base station or a UE) may determine to drop or refrain from transmitting a shared channel or shared signal transmission. For instance, the transmitting device may identify that a potential shared transmission may be scheduled for a receiving device over time resources that at least partially overlap a different shared transmission for the receiving device (e.g., a scheduled shared transmission). In such cases, the transmitting device may determine which of the shared channel or shared signal transmission and the potential shared channel or shared signal transmission is of higher priority (e.g., according to the priority rules) and may transmit only one. In other cases, multiple shared transmissions may be multiplexed for transmission according to a rate-matching scheme defined by the priority rules.

It should be noted that while the techniques described herein are generally directed towards the reception of downlink data or control channels, similar concepts may also be applied for transmitting uplink data or control channels from the UE. In some cases, the UE may define priority rules based on QCL for multiplexing uplink transmissions over the PUSCH, PUCCH, etc.

Figure 5:
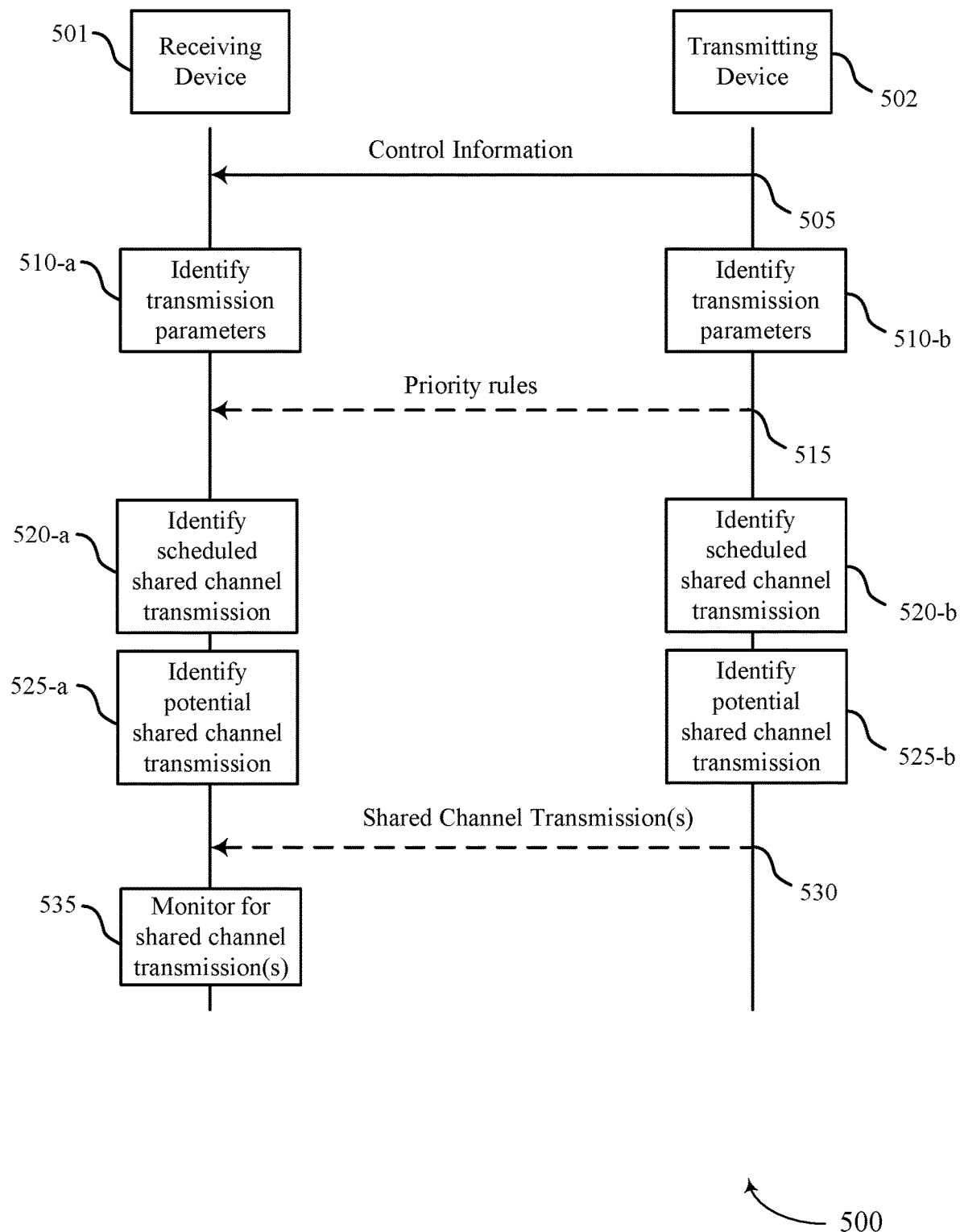
FIG. 5 illustrates an example of a process flow that supports prioritization for potential shared channel transmissions in accordance with aspects of the present disclosure.

FIG. 5 illustrates an example of a process flow 500 that supports prioritization for potential shared channel or shared signal transmissions in accordance with aspects of the present disclosure. In some examples, process flow 500 may implement aspects of wireless communications systems 100 or 200.

Process flow 500 illustrates aspects of techniques performed by a transmitting device 502 and a receiving device 501, each of which may be examples of a base station 105 or a UE 115 described herein.

At 505, receiving device 501 may receive control information, such as DCI or UCI, in a control channel from the transmitting device 502. In some cases, the control information may be used to schedule a shared channel or shared signal transmission in the same or a different TTI.

At 510-a, the receiving device 501 may identify a set of transmission parameters for shared channel or shared signal transmissions with the transmitting device 502. For instance, the receiving device 501 may determine a set of resource allocation schemes and a set of spatial transmission parameters for shared channel or shared signal transmissions based at least in part on the set of transmission parameters. The set of transmission parameters may be identified through the control information transmitted at 505 or via other signaling (e.g., signaling of QCL information, RRC signaling, MAC-CE signaling).

Additionally or alternatively, at 510-b, the transmitting device may identify a set of transmission parameters for shared channel or shared signal transmissions with the receiving device 501. In some cases, the transmitting device 502 may determine a set of resource allocation schemes and a set of spatial transmission parameters for shared channel or shared signal transmissions based at least in part on the set of transmission parameters.

At 515, the receiving device 501 may optionally receive, from the transmitting device 502, an indication of a set of priority rules to be used for monitoring the shared channel or shared signal transmissions. The indicated may be transmitted via RRC signaling, DCI, or a MAC-CE.

In some cases, at 520-a, the receiving device 501 may identify a scheduled shared channel or shared signal transmission associated with a first set of time-frequency resources, where the shared channel or shared signal transmission may be associated with a first priority. In some cases, the receiving device 501 may determine a first set of spatial transmission parameters for the shared channel or shared signal transmission based at least in part on the set of resource allocation schemes (e.g., time-frequency resources for the shared channel or shared signal transmission). In some cases, the shared channel or shared signal transmission may be an example of a potential shared channel or shared signal transmission.

In some other cases, at 520-b, the transmitting device 502 may identify a scheduled shared channel or shared signal transmission associated with a first set of time-frequency resources, where the shared channel or shared signal transmission may be associated with a first priority, for communication with the receiving device 501. In some cases, the transmitting device 502 may determine a first set of spatial transmission parameters for the shared channel or shared signal transmission based at least in part on the set of resource allocation schemes (e.g., time-frequency resources for the shared channel or shared signal transmission). In some cases, the shared channel or shared signal transmission may be an example of a potential shared channel or shared signal transmission.

At 525-a, the receiving device 501 may identify a potential shared channel or shared signal transmission and determine a second set of time-frequency resources for a potential shared channel or shared signal transmission associated with a second priority based at least in part on the transmission parameters identified at 510-a. In some cases, the receiving device 501 may determine a second set of spatial transmission parameters for the potential shared channel or shared signal transmission based at least in part on the set of resource allocation schemes (e.g., time-frequency resources for the potential data transmission). In some cases, the receiving device 501 may determine that the first and second sets of spatial transmission parameters are different. In some examples, the first and second priorities of the shared and potential shared channel or shared signal transmissions, may be associated with a first traffic type or a first channel type (e.g., URLLC traffic), and a second traffic or channel type (e.g., non URLLC, or eMBB traffic), respectively.

At **525-*b*, additionally or alternatively, the transmitting device 502 may identify a potential shared channel or shared signal transmission and determine a second set of time-frequency resources for a potential shared channel or shared signal transmission associated with a second priority based at least in part on the transmission parameters identified at 510-*b*. In some cases, the transmitting device 502 may determine a second set of spatial transmission parameters for the potential shared channel or shared signal transmission based at least in part on the set of resource allocation schemes (e.g., time-frequency resources for the potential data transmission). In some cases, the transmitting device 502** may determine that the first and second sets of spatial transmission parameters are different. In some cases, the first and second priorities of the shared and potential shared transmissions, may be associated with a first traffic type or a first channel type (e.g., URLLC traffic), and a second traffic or channel type (e.g., non URLLC, or eMBB traffic), respectively.

At 530, the transmitting device 502 may transmit at least one of the shared channel or shared signal transmissions over the first set of time-frequency resources or the potential shared channel or shared signal transmission over the second set of time-frequency resources based in part on a set of priority rules for the first and second priority.

At 535, the receiving device 501 may monitor for the shared channel or shared signal transmission(s) or the potential shared data transmission over their respective resources, based at least in part on the set of priority rules received at 515 for the first priority and the second priority. In some cases, the receiving device 501 may only monitor one of the shared channel or shared signal transmissions based in part on determining that the first and second sets of spatial transmission parameters are different at 520. In some other cases, the receiving device 501 may monitor for both the shared channel or shared signal transmissions based in part on a rate matching scheme for the first and second priorities indicated by the set of priority rules. In some cases, one of the scheduled or potential shared channel or shared signal transmissions may not be monitored based on an error classification.

Figure 6:
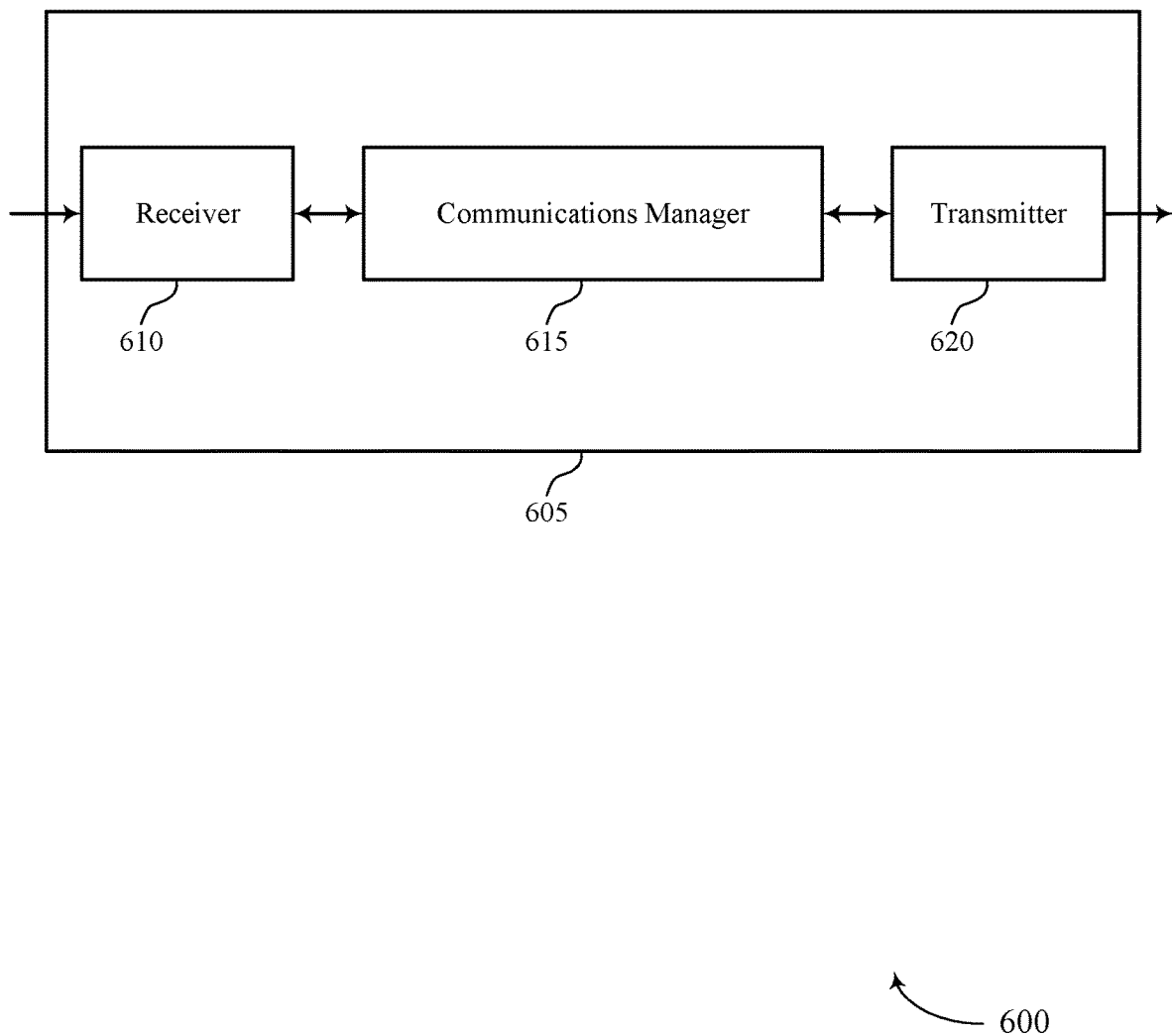
FIGS. 6 and 7 show block diagrams of devices that support prioritization for potential shared channel transmissions in accordance with aspects of the present disclosure.

FIG. 6 shows a block diagram 600 of a device 605 that supports prioritization for potential shared channel or shared signal transmissions in accordance with aspects of the present disclosure. The device 605 may be an example of aspects of a UE 115 or base station 105 as described herein. The device 605 may include a receiver 610, a communications manager 615, and a transmitter 620. The device 605 may also include a processor. Each of these components may be in communication with one another (e.g., via one or more buses).

Receiver 610 may receive information such as packets, user data, or control information associated with various information channels (e.g., control channels, data channels, and information related to prioritization for potential shared channel or shared signal transmissions, etc.). Information may be passed on to other components of the device 605. The receiver 610 may be an example of aspects of the transceiver 920 or 1020 as described with reference to FIGS. 9 and 10. The receiver 610 may utilize a single antenna or a set of antennas.

The communications manager 615 may identify a set of transmission parameters for shared channel or shared signal transmissions in a wireless communications system, identify a shared channel or shared signal transmission associated with a first set of time-frequency resources, the shared channel or shared signal transmission associated with a first priority, determine a second set of time-frequency resources for a potential shared channel or shared signal transmission associated with a second priority based on the set of transmission parameters, and monitor for the shared channel or shared signal transmission over the first set of time-frequency resources or the potential shared channel or shared signal transmission over the second set of time-frequency resources based on a set of priority rules for the first priority and the second priority.

The communications manager 615 may also identify a set of transmission parameters for shared channel or shared signal transmissions in a wireless communications system, identify a shared channel or shared signal transmission associated with a first set of time-frequency resources, the shared channel or shared signal transmission associated with a first priority, determine a second set of time-frequency resources for a potential shared channel or shared signal transmission associated with a second priority based on the set of transmission parameters, and transmit at least one of the shared channel or shared signal transmission over the first set of time-frequency resources or the potential shared channel or shared signal transmission over the second set of time-frequency resources based on a set of priority rules for the first priority and the second priority.

The communications manager 615 may be an example of aspects of the communications manager 910 or 1010 as described herein. The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 620 may transmit signals generated by other components of the device 605. In some examples, the transmitter 620 may be collocated with a receiver 610 in a transceiver module. For example, the transmitter 620 may be an example of aspects of the transceiver 920 or 1020 as described with reference to FIGS. 9 and 10. The transmitter 620 may utilize a single antenna or a set of antennas.

In some examples, communications manager 715 may be implemented as an integrated circuit or chipset for a mobile device modem, and the receiver 710 and transmitter 720 may be implemented as analog components (e.g., amplifiers, filters, antennas, etc.) coupled with the mobile device modem to enable wireless transmission and reception.

The communications manager 715 as described herein may be implemented to realize one or more potential advantages. Various implementations may enable scheduling and prioritization of various transmissions between devices in a wireless network. At least one implementation may enable the communications manager 715 to reduce power consumption by only monitoring for transmissions within a configured frequency range of an active BWP and refraining from monitoring for other transmission that may have a lower priority. At least one implementation may enable communications manager 715 to increase the throughput for higher priority transmissions to device 705 by using multiple antenna ports to transmit and receive communications based on the priority rules.

Based on implementing the prioritization techniques as described herein, one or more processors of the device 705 (e.g., processor(s) controlling or incorporated with one or more of receiver 710, communications manager 715, and transmitter 720) may be able to receive, for example, multiple transmissions having different spatial parameters over the same time-frequency resources or may prioritize transmission of higher priority.

Figure 7:
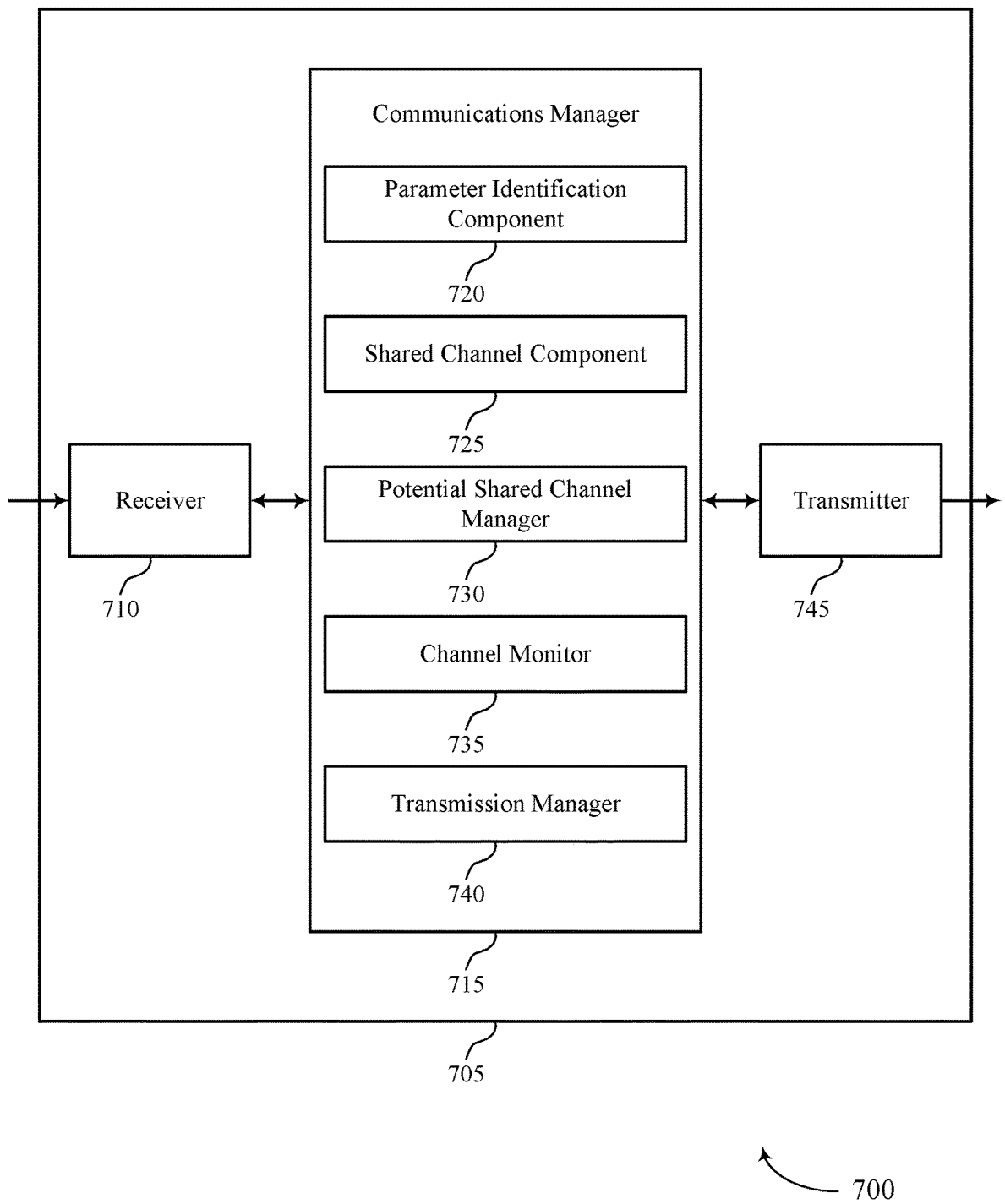

FIG. 7 shows a block diagram 700 of a device 705 that supports prioritization for potential shared channel or shared signal transmissions in accordance with aspects of the present disclosure. The device 705 may be an example of aspects of a device 605, a UE 115, or a base station 105 as described herein. The device 705 may include a receiver 710, a communications manager 715, and a transmitter 745. The device 705 may also include a processor. Each of these components may be in communication with one another (e.g., via one or more buses).

Receiver 710 may receive information such as packets, user data, or control information associated with various information channels (e.g., control channels, data channels, and information related to prioritization for potential shared channel or shared signal transmissions, etc.). Information may be passed on to other components of the device 705. The receiver 710 may be an example of aspects of the transceiver 920 or 1020 as described with reference to FIGS. 9 and 10. The receiver 710 may utilize a single antenna or a set of antennas.

The communications manager 715 may be an example of aspects of the communications manager 615 as described herein. The communications manager 715 may include a parameter identification component 720, a shared channel component 725, a potential shared channel manager 730, a channel monitor 735, and a transmission manager 740. The communications manager 715 may be an example of aspects of the communications manager 910 or 1010 as described herein.

The parameter identification component 720 may identify a set of transmission parameters for shared channel or shared signal transmissions in a wireless communications system.

The shared channel component 725 may identify a shared channel or shared signal transmission associated with a first set of time-frequency resources, the shared channel or shared signal transmission associated with a first priority.

The potential shared channel manager 730 may determine a second set of time-frequency resources for a potential shared channel or shared signal transmission associated with a second priority based on the set of transmission parameters.

The channel monitor 735 may monitor for the shared channel or shared signal transmission over the first set of time-frequency resources or the potential shared channel or shared signal transmission over the second set of time-frequency resources based on a set of priority rules for the first priority and the second priority.

The transmission manager 740 may transmit at least one of the shared channel or shared signal transmission over the first set of time-frequency resources or the potential shared channel or shared signal transmission over the second set of time-frequency resources based on a set of priority rules for the first priority and the second priority.

Transmitter 745 may transmit signals generated by other components of the device 705. In some examples, the transmitter 745 may be collocated with a receiver 710 in a transceiver module. For example, the transmitter 745 may be an example of aspects of the transceiver 920 or 1020 as described with reference to FIGS. 9 and 10. The transmitter 745 may utilize a single antenna or a set of antennas.

Figure 8:
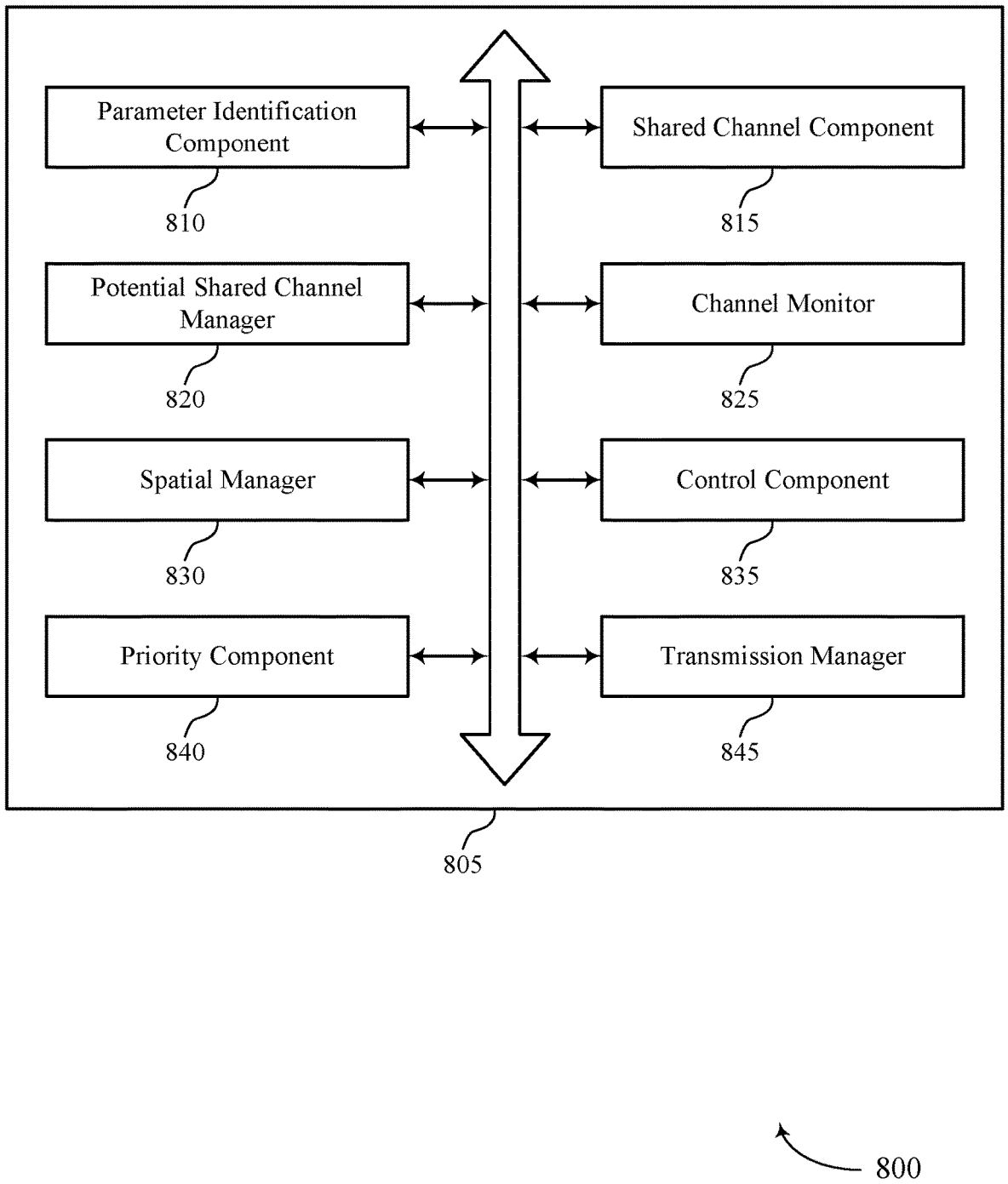
FIG. 8 shows a block diagram of a communications manager that supports prioritization for potential shared channel transmissions in accordance with aspects of the present disclosure.

FIG. 8 shows a block diagram 800 of a communications manager 805 that supports prioritization for potential shared channel or shared signal transmissions in accordance with aspects of the present disclosure. The communications manager 805 may be an example of aspects of a communications manager 615, a communications manager 715, or a communications manager 910 described herein. The communications manager 805 may include a parameter identification component 810, a shared channel component 815, a potential shared channel manager 820, a channel monitor 825, a spatial manager 830, a control component 835, a priority component 840, and a transmission manager 845. Each of these modules may communicate, directly or indirectly, with one another (e.g., via one or more buses).

The parameter identification component 810 may identify a set of transmission parameters for shared channel or shared signal transmissions in a wireless communications system. In some cases, the parameter identification component 810 may determine a set of resource allocation schemes and a set of spatial transmission parameters for shared channel or shared signal transmissions based on the set of transmission parameters. In some instances, the parameter identification component 810 may receive, from a base station, an indication of a set of resource allocation schemes and a set of spatial transmission parameters for shared channel or shared signal transmissions. In some aspects, the parameter identification component 810 may transmit, to a UE, an indication of a set of resource allocation schemes and a set of spatial transmission parameters for shared channel or shared signal transmissions.

The shared channel component 815 may identify a shared channel or shared signal transmission associated with a first set of time-frequency resources, the shared channel or shared signal transmission associated with a first priority. In some cases, the shared channel or shared signal transmission includes a second potential shared channel or shared signal transmission.

The potential shared channel manager 820 may determine a second set of time-frequency resources for a potential shared channel or shared signal transmission associated with a second priority based on the set of transmission parameters. In some cases, the first priority of the shared channel or shared signal transmission is associated with a first traffic type or a first channel type based on the set of priority rules. In some aspects, the second priority of the potential shared channel or shared signal transmission is associated with a second traffic type or a second channel type based on the set of priority rules. In some instances, the shared channel or shared signal transmission, the potential shared channel or shared signal transmission, or any combination thereof includes a data transmission.

The channel monitor 825 may monitor for the shared channel or shared signal transmission over the first set of time-frequency resources or the potential shared channel or shared signal transmission over the second set of time-frequency resources based on a set of priority rules for the first priority and the second priority. In some examples, the channel monitor 825 may monitor for the shared channel or shared signal transmission over the first set of time-frequency resources or the potential shared channel or shared signal transmission over the second set of time-frequency resources based on the first and second sets of spatial transmission parameters. In some cases, the channel monitor 825 may monitor for one of the shared channel or shared signal transmission or the potential shared channel or shared signal transmission based on determining that the first and second sets of spatial transmission parameters are different. In some aspects, the channel monitor 825 may monitor for the potential shared channel or shared signal transmission over the second set of time-frequency resources, where the second priority is higher than the first priority. In some instances, the channel monitor 825 may monitor for the shared channel or shared signal transmission over the first set of time-frequency resources, where the first priority is higher than the second priority.

In some examples, the channel monitor 825 may monitor for both the shared channel or shared signal transmission over the first set of time-frequency resources and the potential shared channel or shared signal transmission over the second set of time-frequency resources based on a rate-matching scheme for the first priority and the second priority indicated by the set of priority rules. In some cases, the channel monitor 825 may monitor for one of the shared channel or shared signal transmission over the first set of time-frequency resources or the potential shared channel or shared signal transmission over the second set of time-frequency resources based on an error classification of the shared channel or shared signal transmission or the potential shared channel or shared signal transmission. In some aspects, the first and second sets of time-frequency resources are at least partially overlapping.

The transmission manager 845 may transmit at least one of the shared channel or shared signal transmission over the first set of time-frequency resources or the potential shared channel or shared signal transmission over the second set of time-frequency resources based on a set of priority rules for the first priority and the second priority. In some examples, the transmission manager 845 may transmit at least one of the shared channel or shared signal transmission over the first set of time-frequency resources or the potential shared channel or shared signal transmission over the second set of time-frequency resources based on the first and second sets of spatial transmission parameters. In some cases, the transmission manager 845 may transmit the potential shared channel or shared signal transmission over the second set of time-frequency resources, where the second priority is higher than the first priority. In some aspects, the transmission manager 845 may drop the shared channel or shared signal transmission based on transmitting the potential shared channel or shared signal transmission. In some instances, the transmission manager 845 may transmit the shared channel or shared signal transmission over the first set of time-frequency resources, where the first priority is higher than the second priority.

In some examples, the transmission manager 845 may drop the potential shared channel or shared signal transmission based on transmitting the shared channel or shared signal transmission. In some cases, the transmission manager 845 may transmit both the shared channel or shared signal transmission over the first set of time-frequency resources and the potential shared channel or shared signal transmission over the second set of time-frequency resources based on a rate-matching scheme for the first priority and the second priority indicated by the set of priority rules.

The spatial manager 830 may determine a first set of spatial transmission parameters for the shared channel or shared signal transmission based on the set of resource allocation schemes. In some examples, the spatial manager 830 may determine a second set of spatial transmission parameters for the potential shared channel or shared signal transmission based on the set of resource allocation schemes. In some cases, the spatial manager 830 may determine that the first and second sets of spatial transmission parameters are different.

The control component 835 may receive control information indicating information for scheduling the shared channel or shared signal transmission.

The priority component 840 may receive, from a base station, an indication of the set of priority rules via RRC signaling, DCI, or a MAC-CE. In some examples, the priority component 840 may transmit, to a UE, an indication of the set of priority rules via RRC signaling, DCI, or a MAC-CE.

Figure 9:
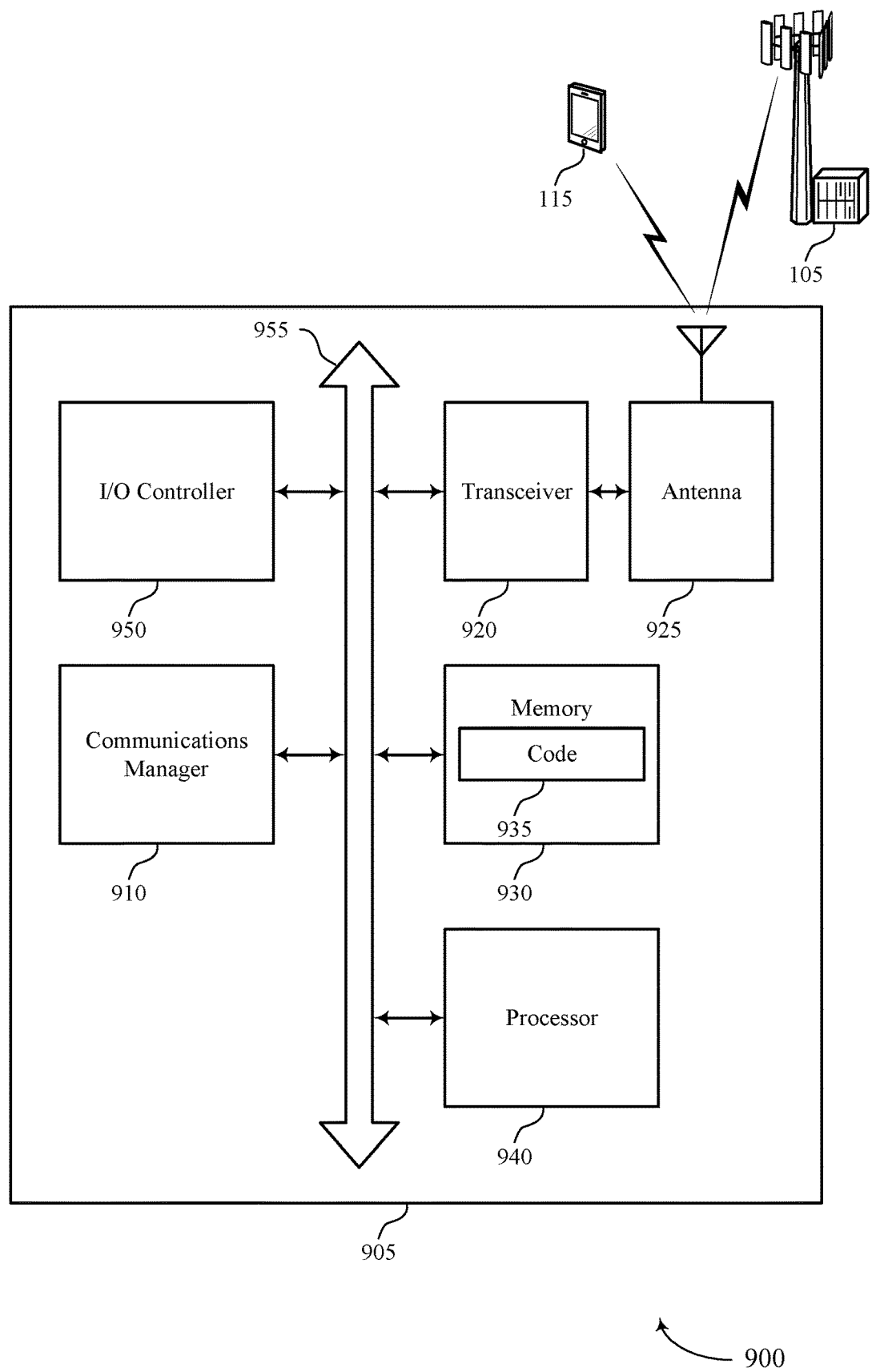
FIG. 9 shows a diagram of a system including a user equipment (UE) that supports prioritization for potential shared channel transmissions in accordance with aspects of the present disclosure.

FIG. 9 shows a diagram of a system 900 including a device 905 that supports prioritization for potential shared channel or shared signal transmissions in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, a transceiver 920, an antenna 925, memory 930, a processor 940, and an I/O controller 950. These components may be in electronic communication via one or more buses (e.g., bus 955).

The communications manager 910 may identify a set of transmission parameters for shared channel or shared signal transmissions in a wireless communications system, identify a shared channel or shared signal transmission associated with a first set of time-frequency resources, the shared channel or shared signal transmission associated with a first priority, determine a second set of time-frequency resources for a potential shared channel or shared signal transmission associated with a second priority based on the set of transmission parameters, and monitor for the shared channel or shared signal transmission over the first set of time-frequency resources or the potential shared channel or shared signal transmission over the second set of time-frequency resources based on a set of priority rules for the first priority and the second priority.

The communications manager 910 may also identify a set of transmission parameters for shared channel or shared signal transmissions in a wireless communications system, identify a shared channel or shared signal transmission associated with a first set of time-frequency resources, the shared channel or shared signal transmission associated with a first priority, determine a second set of time-frequency resources for a potential shared channel or shared signal transmission associated with a second priority based on the set of transmission parameters, and transmit at least one of the shared channel or shared signal transmission over the first set of time-frequency resources or the potential shared channel or shared signal transmission over the second set of time-frequency resources based on a set of priority rules for the first priority and the second priority.

Transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM), read only memory (ROM), or a combination thereof. The memory 930 may store computer-readable code 935 including instructions that, when executed by a processor (e.g., the processor 940) cause the device to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a digital signal processor (DSP), a central processing unit (CPU), a microcontroller, an application specific integrated circuit (ASIC), a field programmable gate array (FPGA), a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting prioritization for potential shared channel or shared signal transmissions).

The I/O controller 950 may manage input and output signals for the device 905. The I/O controller 950 may also manage peripherals not integrated into the device 905. In some cases, the I/O controller 950 may represent a physical connection or port to an external peripheral. In some cases, the I/O controller 950 may utilize an operating system such as iOS®, ANDROID®, MS-DOS®, MS-WINDOWS®, OS/2®, UNIX®, LINUX®, or another known operating system. In other cases, the I/O controller 950 may represent or interact with a modem, a keyboard, a mouse, a touchscreen, or a similar device. In some cases, the I/O controller 950 may be implemented as part of a processor. In some cases, a user may interact with the device 905 via the I/O controller 950 or via hardware components controlled by the I/O controller 950.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
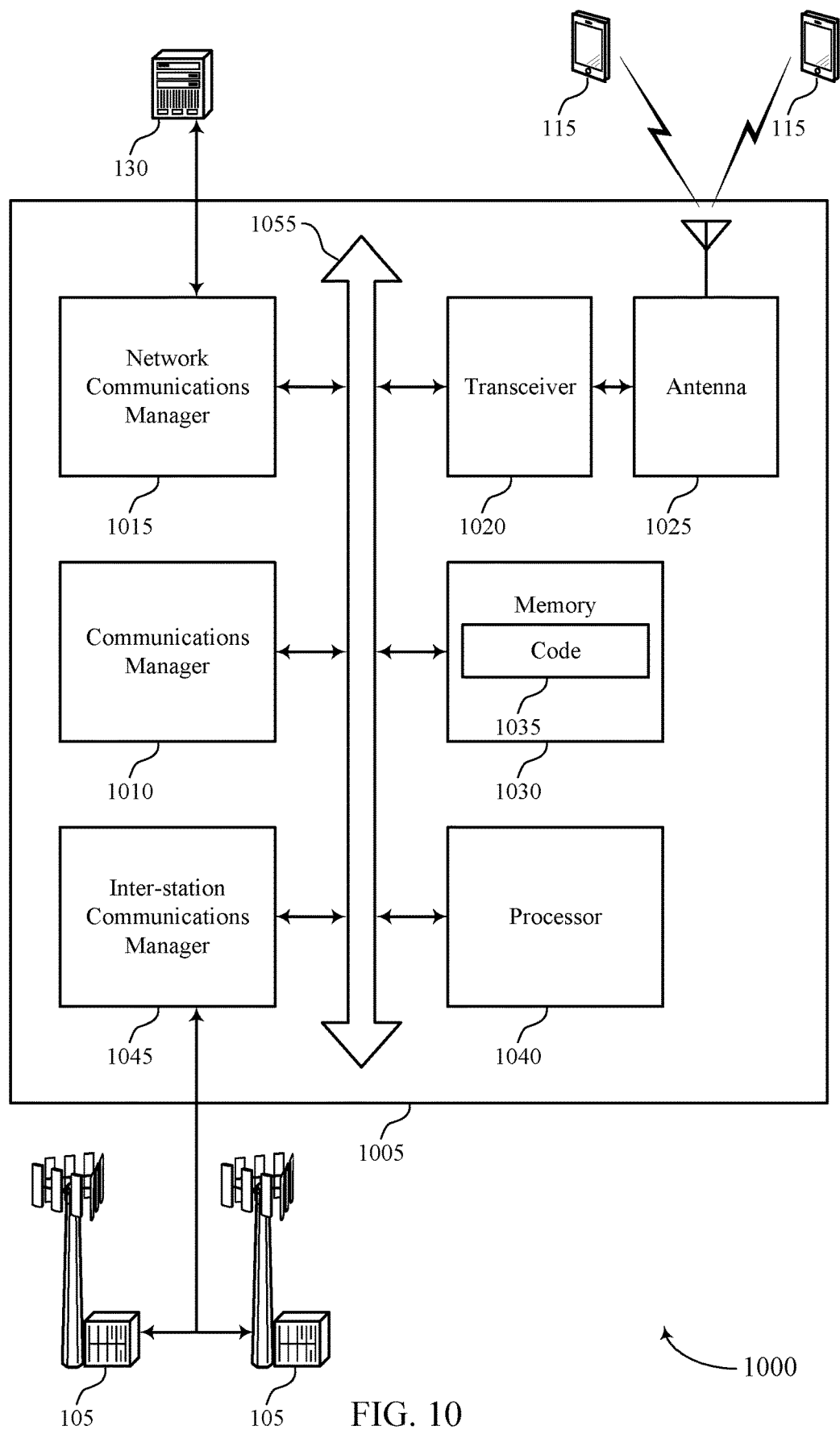
FIG. 10 shows a diagram of a system including a base station that supports prioritization for potential shared channel transmissions in accordance with aspects of the present disclosure.

FIG. 10 shows a diagram of a system 1000 including a device 1005 that supports prioritization for potential shared channel or shared signal transmissions in accordance with aspects of the present disclosure. The device 1005 may be an example of or include the components of device 605, device 705, or a base station 105 as described herein. The device 1005 may include components for bi-directional voice and data communications including components for transmitting and receiving communications, including a communications manager 1010, a network communications manager 1015, a transceiver 1020, an antenna 1025, memory 1030, a processor 1040, and an inter-station communications manager 1045. These components may be in electronic communication via one or more buses (e.g., bus 1055).

The communications manager 1010 may identify a set of transmission parameters for shared channel or shared signal transmissions in a wireless communications system, identify a shared channel or shared signal transmission associated with a first set of time-frequency resources, the shared channel or shared signal transmission associated with a first priority, determine a second set of time-frequency resources for a potential shared channel or shared signal transmission associated with a second priority based on the set of transmission parameters, and monitor for the shared channel or shared signal transmission over the first set of time-frequency resources or the potential shared channel or shared signal transmission over the second set of time-frequency resources based on a set of priority rules for the first priority and the second priority.

The communications manager 1010 may also identify a set of transmission parameters for shared channel or shared signal transmissions in a wireless communications system, identify a shared channel or shared signal transmission associated with a first set of time-frequency resources, the shared channel or shared signal transmission associated with a first priority, determine a second set of time-frequency resources for a potential shared channel or shared signal transmission associated with a second priority based on the set of transmission parameters, and transmit at least one of the shared channel or shared signal transmission over the first set of time-frequency resources or the potential shared channel or shared signal transmission over the second set of time-frequency resources based on a set of priority rules for the first priority and the second priority.

Network communications manager 1015 may manage communications with the core network (e.g., via one or more wired backhaul links). For example, the network communications manager 1015 may manage the transfer of data communications for client devices, such as one or more UEs 115.

Transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM, ROM, or a combination thereof. The memory 1030 may store computer-readable code 1035 including instructions that, when executed by a processor (e.g., the processor 1040) cause the device to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting prioritization for potential shared channel or shared signal transmissions).

Inter-station communications manager 1045 may manage communications with other base station 105, and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, inter-station communications manager 1045 may provide an X2 interface within an LTE/LTE-A wireless communication network technology to provide communication between base stations 105.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
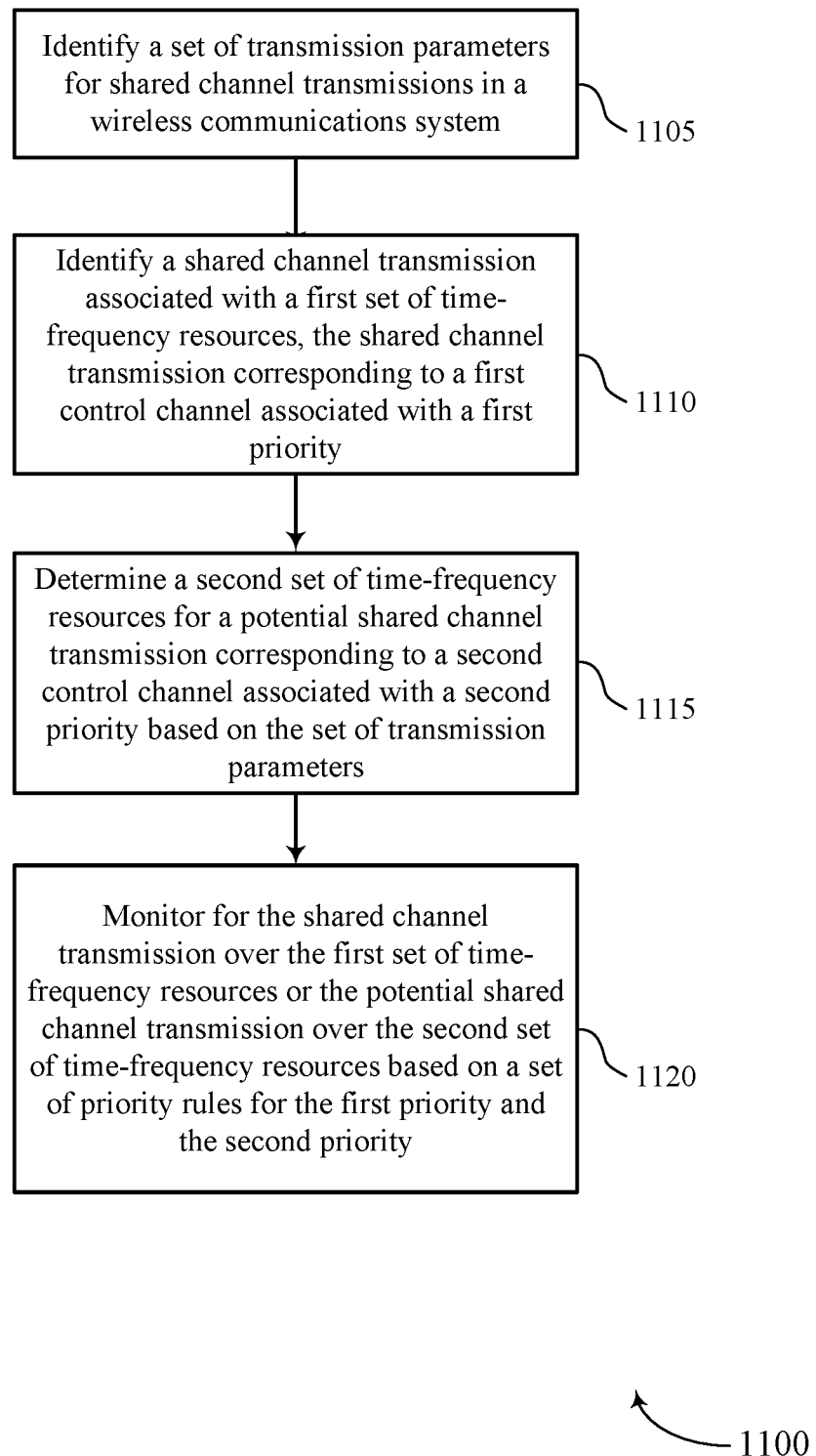
FIGS. 11 through 16 show flowcharts illustrating methods that support prioritization for potential shared channel transmissions in accordance with aspects of the present disclosure.

FIG. 11 shows a flowchart illustrating a method 1100 that supports prioritization for potential shared channel or shared signal transmissions in accordance with aspects of the present disclosure. The operations of method 1100 may be implemented by a UE 115 or base station 105 or its components as described herein. For example, the operations of method 1100 may be performed by a communications manager as described with reference to FIGS. 6 through 10. In some examples, a UE or base station may execute a set of instructions to control the functional elements of the UE or base station to perform the functions described herein. Additionally or alternatively, a UE or base station may perform aspects of the functions described herein using special-purpose hardware.

At 1105, the UE or base station may identify a set of transmission parameters for shared channel or shared signal transmissions in a wireless communications system. The operations of 1105 may be performed according to the methods described herein. In some examples, aspects of the operations of 1105 may be performed by a parameter identification component as described with reference to FIGS. 6 through 10.

At 1110, the UE or base station may identify a shared channel or shared signal transmission associated with a first set of time-frequency resources, the shared channel or shared signal transmission associated with a first priority. The operations of 1110 may be performed according to the methods described herein. In some examples, aspects of the operations of 1110 may be performed by a shared channel component as described with reference to FIGS. 6 through 10.

At 1115, the UE or base station may determine a second set of time-frequency resources for a potential shared channel or shared signal transmission associated with a second priority based on the set of transmission parameters. The operations of 1115 may be performed according to the methods described herein. In some examples, aspects of the operations of 1115 may be performed by a potential shared channel manager as described with reference to FIGS. 6 through 10.

At 1120, the UE or base station may monitor for the shared channel or shared signal transmission over the first set of time-frequency resources or the potential shared channel or shared signal transmission over the second set of time-frequency resources based on a set of priority rules for the first priority and the second priority. The operations of 1120 may be performed according to the methods described herein. In some examples, aspects of the operations of 1120 may be performed by a channel monitor as described with reference to FIGS. 6 through 10.

Figure 12:
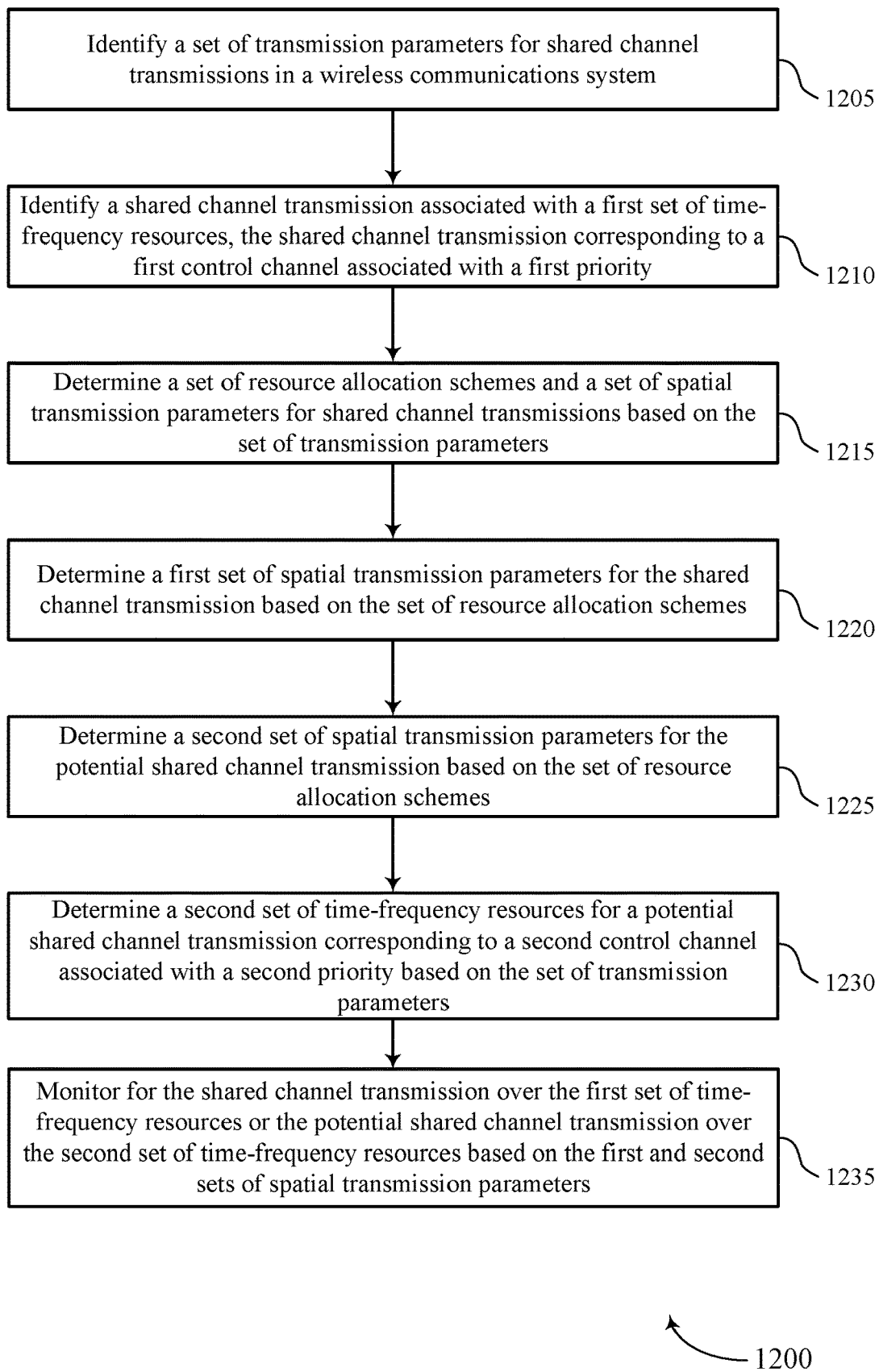

FIG. 12 shows a flowchart illustrating a method 1200 that supports prioritization for potential shared channel or shared signal transmissions in accordance with aspects of the present disclosure. The operations of method 1200 may be implemented by a UE 115 or base station 105 or its components as described herein. For example, the operations of method 1200 may be performed by a communications manager as described with reference to FIGS. 6 through 10. In some examples, a UE or base station may execute a set of instructions to control the functional elements of the UE or base station to perform the functions described herein. Additionally or alternatively, a UE or base station may perform aspects of the functions described herein using special-purpose hardware.

At 1205, the UE or base station may identify a set of transmission parameters for shared channel or shared signal transmissions in a wireless communications system. The operations of 1205 may be performed according to the methods described herein. In some examples, aspects of the operations of 1205 may be performed by a parameter identification component as described with reference to FIGS. 6 through 10.

At 1210, the UE or base station may identify a shared channel or shared signal transmission associated with a first set of time-frequency resources, the shared channel or shared signal transmission associated with a first priority. The operations of 1210 may be performed according to the methods described herein. In some examples, aspects of the operations of 1210 may be performed by a shared channel component as described with reference to FIGS. 6 through 10.

At 1215, the UE or base station may determine a set of resource allocation schemes and a set of spatial transmission parameters for shared channel or shared signal transmissions based on the set of transmission parameters. The operations of 1215 may be performed according to the methods described herein. In some examples, aspects of the operations of 1215 may be performed by a parameter identification component as described with reference to FIGS. 6 through 10.

At 1220, the UE or base station may determine a first set of spatial transmission parameters for the shared channel or shared signal transmission based on the set of resource allocation schemes. The operations of 1220 may be performed according to the methods described herein. In some examples, aspects of the operations of 1220 may be performed by a spatial manager as described with reference to FIGS. 6 through 10.

At 1225, the UE or base station may determine a second set of spatial transmission parameters for the potential shared channel or shared signal transmission based on the set of resource allocation schemes. The operations of 1225 may be performed according to the methods described herein. In some examples, aspects of the operations of 1225 may be performed by a spatial manager as described with reference to FIGS. 6 through 10.

At 1230, the UE or base station may determine a second set of time-frequency resources for a potential shared channel or shared signal transmission associated with a second priority based on the set of transmission parameters. The operations of 1230 may be performed according to the methods described herein. In some examples, aspects of the operations of 1230 may be performed by a potential shared channel manager as described with reference to FIGS. 6 through 10.

At 1235, the UE or base station may monitor for the shared channel or shared signal transmission over the first set of time-frequency resources or the potential shared channel or shared signal transmission over the second set of time-frequency resources based on the first and second sets of spatial transmission parameters. The operations of 1235 may be performed according to the methods described herein. In some examples, aspects of the operations of 1235 may be performed by a channel monitor as described with reference to FIGS. 6 through 10.

Figure 13:
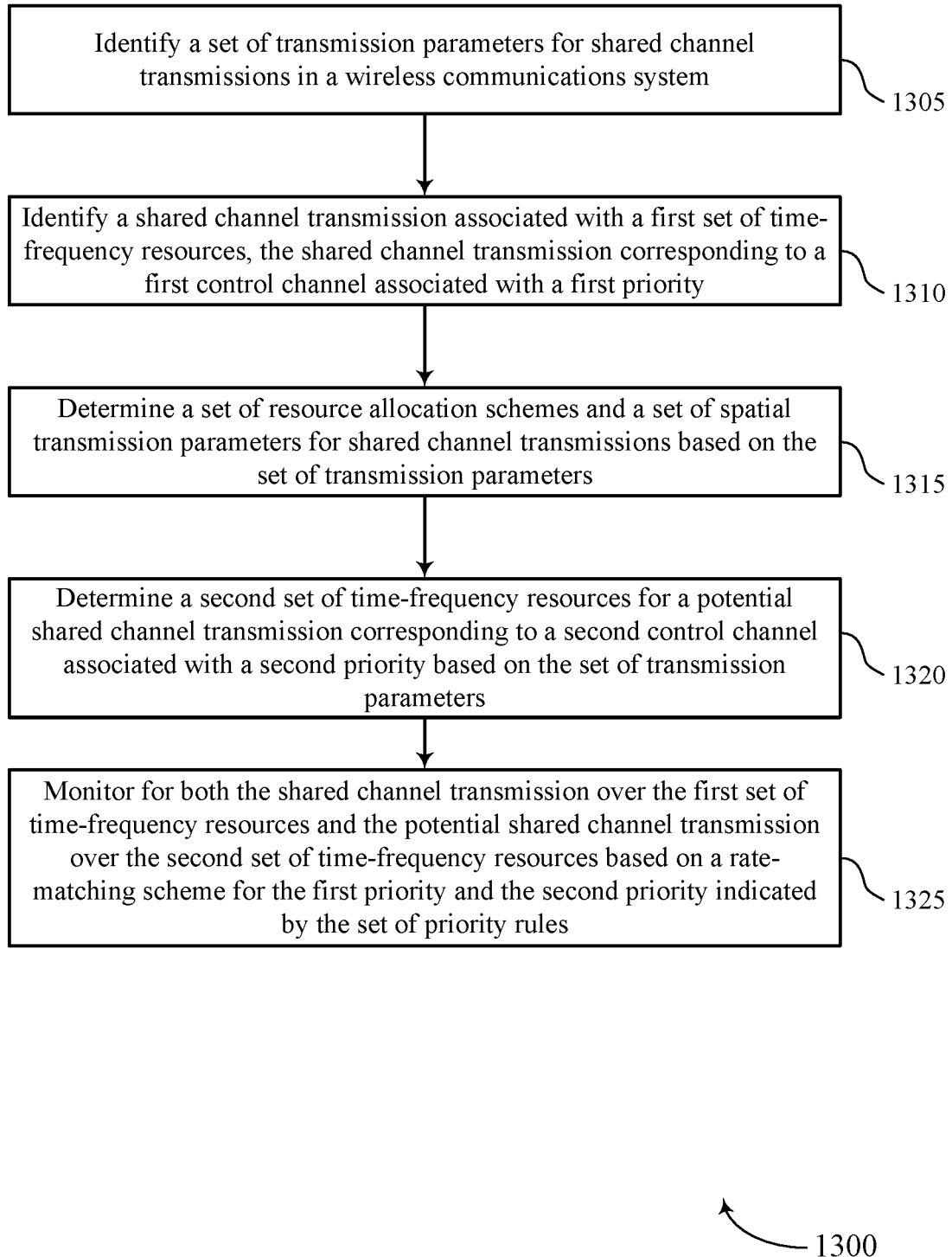

FIG. 13 shows a flowchart illustrating a method 1300 that supports prioritization for potential shared channel or shared signal transmissions in accordance with aspects of the present disclosure. The operations of method 1300 may be implemented by a UE 115 or base station 105 or its components as described herein. For example, the operations of method 1300 may be performed by a communications manager as described with reference to FIGS. 6 through 10. In some examples, a UE or base station may execute a set of instructions to control the functional elements of the UE or base station to perform the functions described herein. Additionally or alternatively, a UE or base station may perform aspects of the functions described herein using special-purpose hardware.

At 1305, the UE or base station may identify a set of transmission parameters for shared channel or shared signal transmissions in a wireless communications system. The operations of 1305 may be performed according to the methods described herein. In some examples, aspects of the operations of 1305 may be performed by a parameter identification component as described with reference to FIGS. 6 through 10.

At 1310, the UE or base station may identify a shared channel or shared signal transmission associated with a first set of time-frequency resources, the shared channel or shared signal transmission associated with a first priority. The operations of 1310 may be performed according to the methods described herein. In some examples, aspects of the operations of 1310 may be performed by a shared channel component as described with reference to FIGS. 6 through 10.

At 1315, the UE or base station may determine a set of resource allocation schemes and a set of spatial transmission parameters for shared channel or shared signal transmissions based on the set of transmission parameters. The operations of 1315 may be performed according to the methods described herein. In some examples, aspects of the operations of 1315 may be performed by a parameter identification component as described with reference to FIGS. 6 through 10.

At 1320, the UE or base station may determine a second set of time-frequency resources for a potential shared channel or shared signal transmission associated with a second priority based on the set of transmission parameters. The operations of 1320 may be performed according to the methods described herein. In some examples, aspects of the operations of 1320 may be performed by a potential shared channel manager as described with reference to FIGS. 6 through 10.

At 1325, the UE or base station may monitor for both the shared channel or shared signal transmission over the first set of time-frequency resources and the potential shared channel or shared signal transmission over the second set of time-frequency resources based on a rate-matching scheme for the first priority and the second priority indicated by the set of priority rules. The operations of 1325 may be performed according to the methods described herein. In some examples, aspects of the operations of 1325 may be performed by a channel monitor as described with reference to FIGS. 6 through 10.

Figure 14:
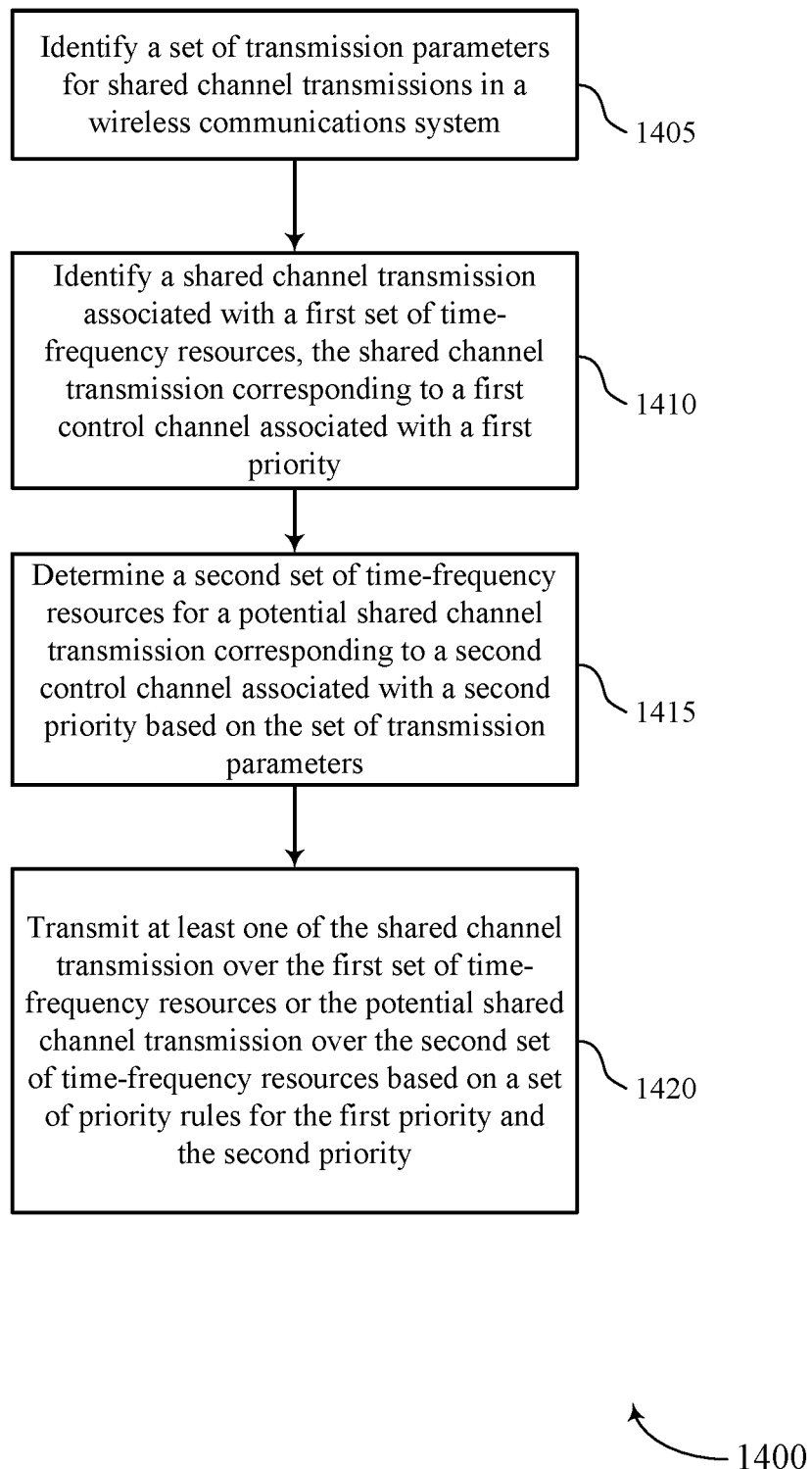

FIG. 14 shows a flowchart illustrating a method 1400 that supports prioritization for potential shared channel or shared signal transmissions in accordance with aspects of the present disclosure. The operations of method 1400 may be implemented by a UE 115 or base station 105 or its components as described herein. For example, the operations of method 1400 may be performed by a communications manager as described with reference to FIGS. 6 through 10. In some examples, a UE or base station may execute a set of instructions to control the functional elements of the UE or base station to perform the functions described herein. Additionally or alternatively, a UE or base station may perform aspects of the functions described herein using special-purpose hardware.

At 1405, the UE or base station may identify a set of transmission parameters for shared channel or shared signal transmissions in a wireless communications system. The operations of 1405 may be performed according to the methods described herein. In some examples, aspects of the operations of 1405 may be performed by a parameter identification component as described with reference to FIGS. 6 through 10.

At 1410, the UE or base station may identify a shared channel or shared signal transmission associated with a first set of time-frequency resources, the shared channel or shared signal transmission associated with a first priority. The operations of 1410 may be performed according to the methods described herein. In some examples, aspects of the operations of 1410 may be performed by a shared channel component as described with reference to FIGS. 6 through 10.

At 1415, the UE or base station may determine a second set of time-frequency resources for a potential shared channel or shared signal transmission associated with a second priority based on the set of transmission parameters. The operations of 1415 may be performed according to the methods described herein. In some examples, aspects of the operations of 1415 may be performed by a potential shared channel manager as described with reference to FIGS. 6 through 10.

At 1420, the UE or base station may transmit at least one of the shared channel or shared signal transmission over the first set of time-frequency resources or the potential shared channel or shared signal transmission over the second set of time-frequency resources based on a set of priority rules for the first priority and the second priority. The operations of 1420 may be performed according to the methods described herein. In some examples, aspects of the operations of 1420 may be performed by a transmission manager as described with reference to FIGS. 6 through 10.

Figure 15:
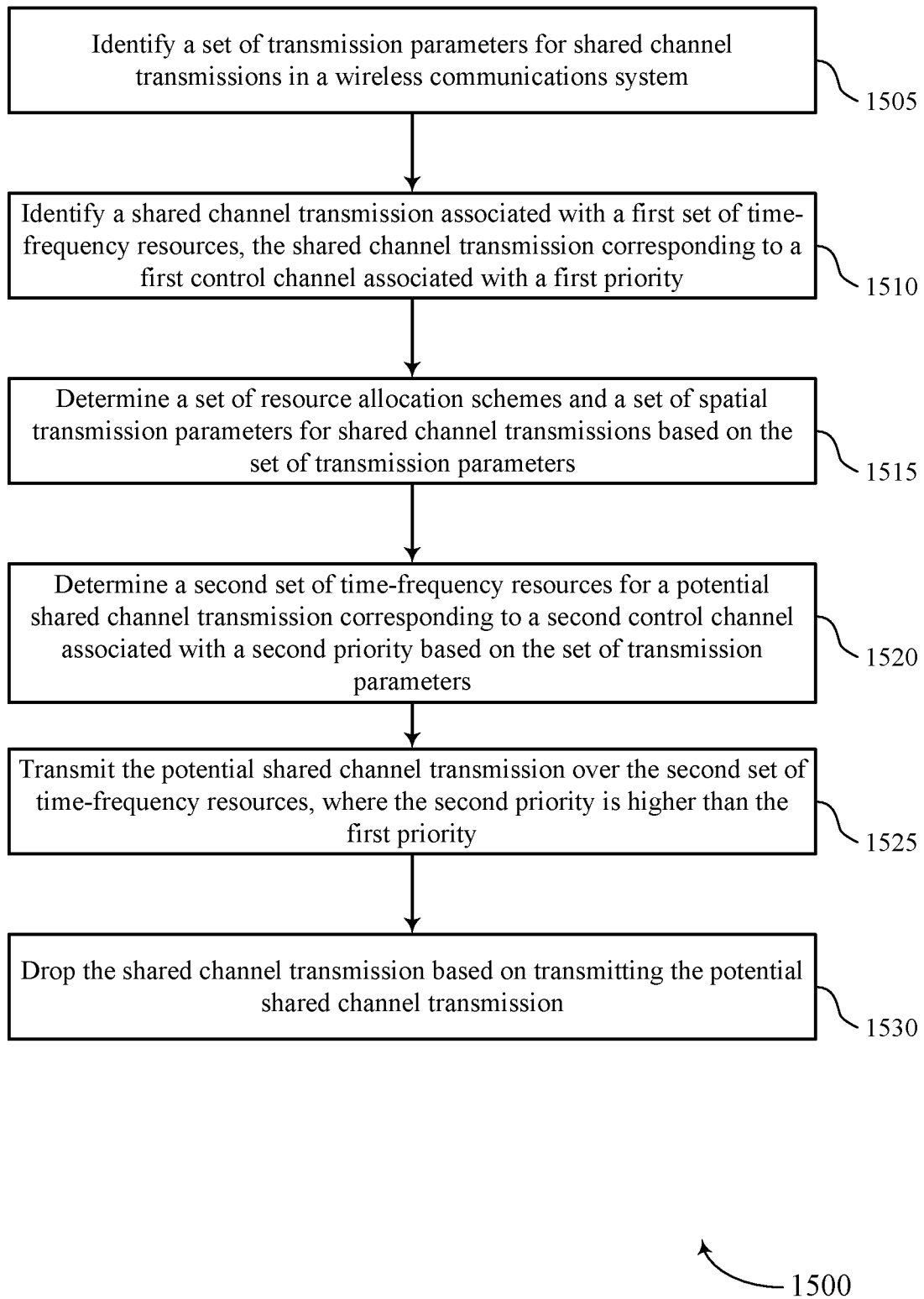

FIG. 15 shows a flowchart illustrating a method 1500 that supports prioritization for potential shared channel or shared signal transmissions in accordance with aspects of the present disclosure. The operations of method 1500 may be implemented by a UE 115 or base station 105 or its components as described herein. For example, the operations of method 1500 may be performed by a communications manager as described with reference to FIGS. 6 through 10. In some examples, a UE or base station may execute a set of instructions to control the functional elements of the UE or base station to perform the functions described herein. Additionally or alternatively, a UE or base station may perform aspects of the functions described herein using special-purpose hardware.

At 1505, the UE or base station may identify a set of transmission parameters for shared channel or shared signal transmissions in a wireless communications system. The operations of 1505 may be performed according to the methods described herein. In some examples, aspects of the operations of 1505 may be performed by a parameter identification component as described with reference to FIGS. 6 through 10.

At 1510, the UE or base station may identify a shared channel or shared signal transmission associated with a first set of time-frequency resources, the shared channel or shared signal transmission associated with a first priority. The operations of 1510 may be performed according to the methods described herein. In some examples, aspects of the operations of 1510 may be performed by a shared channel component as described with reference to FIGS. 6 through 10.

At 1515, the UE or base station may determine a set of resource allocation schemes and a set of spatial transmission parameters for shared channel or shared signal transmissions based on the set of transmission parameters. The operations of 1515 may be performed according to the methods described herein. In some examples, aspects of the operations of 1515 may be performed by a parameter identification component as described with reference to FIGS. 6 through 10.

At 1520, the UE or base station may determine a second set of time-frequency resources for a potential shared channel or shared signal transmission associated with a second priority based on the set of transmission parameters. The operations of 1520 may be performed according to the methods described herein. In some examples, aspects of the operations of 1520 may be performed by a potential shared channel manager as described with reference to FIGS. 6 through 10.

At 1525, the UE or base station may transmit the potential shared channel or shared signal transmission over the second set of time-frequency resources, where the second priority is higher than the first priority. The operations of 1525 may be performed according to the methods described herein. In some examples, aspects of the operations of 1525 may be performed by a transmission manager as described with reference to FIGS. 6 through 10.

At 1530, the UE or base station may drop the shared channel or shared signal transmission based on transmitting the potential shared channel or shared signal transmission. The operations of 1530 may be performed according to the methods described herein. In some examples, aspects of the operations of 1530 may be performed by a transmission manager as described with reference to FIGS. 6 through 10.

Figure 16:
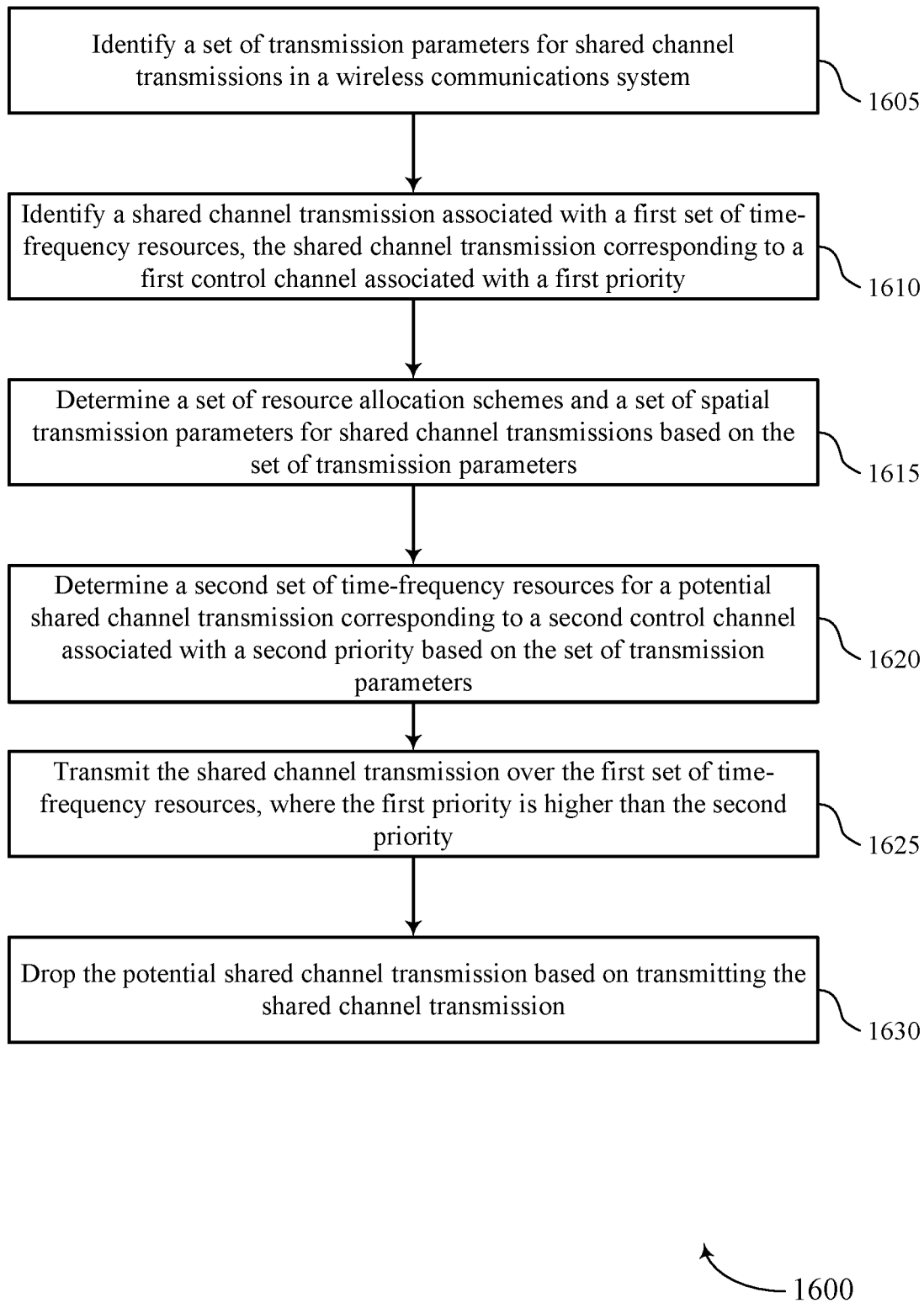

FIG. 16 shows a flowchart illustrating a method 1600 that supports prioritization for potential shared channel or shared signal transmissions in accordance with aspects of the present disclosure. The operations of method 1600 may be implemented by a UE 115 or base station 105 or its components as described herein. For example, the operations of method 1600 may be performed by a communications manager as described with reference to FIGS. 6 through 10. In some examples, a UE or base station may execute a set of instructions to control the functional elements of the UE or base station to perform the functions described herein. Additionally or alternatively, a UE or base station may perform aspects of the functions described herein using special-purpose hardware.

At 1605, the UE or base station may identify a set of transmission parameters for shared channel or shared signal transmissions in a wireless communications system. The operations of 1605 may be performed according to the methods described herein. In some examples, aspects of the operations of 1605 may be performed by a parameter identification component as described with reference to FIGS. 6 through 10.

At 1610, the UE or base station may identify a shared channel or shared signal transmission associated with a first set of time-frequency resources, the shared channel or shared signal transmission associated with a first priority. The operations of 1610 may be performed according to the methods described herein. In some examples, aspects of the operations of 1610 may be performed by a shared channel component as described with reference to FIGS. 6 through 10.

At 1615, the UE or base station may determine a set of resource allocation schemes and a set of spatial transmission parameters for shared channel or shared signal transmissions based on the set of transmission parameters. The operations of 1615 may be performed according to the methods described herein. In some examples, aspects of the operations of 1615 may be performed by a parameter identification component as described with reference to FIGS. 6 through 10.

At 1620, the UE or base station may determine a second set of time-frequency resources for a potential shared channel or shared signal transmission associated with a second priority based on the set of transmission parameters. The operations of 1620 may be performed according to the methods described herein. In some examples, aspects of the operations of 1620 may be performed by a potential shared channel manager as described with reference to FIGS. 6 through 10.

At 1625, the UE or base station may transmit the shared channel or shared signal transmission over the first set of time-frequency resources, where the first priority is higher than the second priority. The operations of 1625 may be performed according to the methods described herein. In some examples, aspects of the operations of 1625 may be performed by a transmission manager as described with reference to FIGS. 6 through 10.

At 1630, the UE or base station may drop the potential shared channel or shared signal transmission based on transmitting the shared channel or shared signal transmission. The operations of 1630 may be performed according to the methods described herein. In some examples, aspects of the operations of 1630 may be performed by a transmission manager as described with reference to FIGS. 6 through 10.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations herein are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   identifying a set of transmission parameters for shared channel transmissions in a wireless communications system;
   receiving, before a threshold time, a first control channel associated with a first priority, the first control channel indicating a first set of time-frequency resources that occur after the threshold time, the first set of time-frequency resources allocated for a shared channel transmission for the UE;
   determining a second set of time-frequency resources that occur after the threshold time, the second set of time-frequency resources associated with a potential shared channel transmission that is currently unscheduled, the potential shared channel transmission corresponding to a second control channel to be monitored for by the UE after the threshold time, the second control channel associated with a second priority based at least in part on the set of transmission parameters; and
   monitoring for the shared channel transmission over the first set of time-frequency resources or the potential shared channel transmission over the second set of time-frequency resources based at least in part on a set of priority rules for the first priority and the second priority, the set of priority rules applied before the threshold time for the potential shared channel transmission that is currently unscheduled.

2. The method of claim 1, further comprising:
   determining a set of resource allocation schemes and a set of spatial transmission parameters for shared channel transmissions based at least in part on the set of transmission parameters.

3. The method of claim 2, further comprising:
   determining a first set of spatial transmission parameters for the shared channel transmission based at least in part on the set of resource allocation schemes;
   determining a second set of spatial transmission parameters for the potential shared channel transmission based at least in part on the set of resource allocation schemes; and
   monitoring for the shared channel transmission over the first set of time-frequency resources or the potential shared channel transmission over the second set of time-frequency resources based at least in part on the first and second sets of spatial transmission parameters.

4. The method of claim 3, further comprising:
   determining that the first and second sets of spatial transmission parameters are different; and
   monitoring for one of the shared channel transmission or the potential shared channel transmission based at least in part on determining that the first and second sets of spatial transmission parameters are different.

5. The method of claim 3, wherein the first and second sets of time-frequency resources are at least partially overlapping.

6. The method of claim 2, wherein identifying the shared channel transmission comprises:
   receiving control information indicating information for scheduling the shared channel transmission.

7. The method of claim 2, further comprising:
   monitoring for the potential shared channel transmission over the second set of time-frequency resources, wherein the second priority is higher than the first priority.

8. The method of claim 2, further comprising:
   monitoring for the shared channel transmission over the first set of time-frequency resources, wherein the first priority is higher than the second priority.

9. The method of claim 2, further comprising:
   monitoring for both the shared channel transmission over the first set of time-frequency resources and the potential shared channel transmission over the second set of time-frequency resources based at least in part on a rate-matching scheme for the first priority and the second priority indicated by the set of priority rules.

10. The method of claim 2, further comprising:
    monitoring for one of the shared channel transmission over the first set of time-frequency resources or the potential shared channel transmission over the second set of time-frequency resources based at least in part on an error classification of the shared channel transmission or the potential shared channel transmission.

11. The method of claim 2, wherein:
the first priority of the shared channel transmission is associated with a first traffic type or a first channel type based at least in part on the set of priority rules; and
the second priority of the potential shared channel transmission is associated with a second traffic type or a second channel type based at least in part on the set of priority rules.

12. The method of claim 2, wherein the shared channel transmission comprises a second potential shared channel transmission.

13. The method of claim 1, further comprising:
receiving, from a base station, an indication of the set of priority rules via radio resource control (RRC) signaling, downlink control information (DCI), or a media access control-control element (MAC-CE).

14. The method of claim 1, further comprising:
receiving, from a base station, an indication of a set of resource allocation schemes and a set of spatial transmission parameters for shared channel transmissions.

15. The method of claim 1, further comprising:
transmitting, to a second UE, an indication of a set of resource allocation schemes and a set of spatial transmission parameters for shared channel transmissions.

16. The method of claim 1, wherein the shared channel transmission, the potential shared channel transmission, or any combination thereof comprises a data transmission.

17. A method for wireless communications at a base station, comprising:
identifying a set of transmission parameters for shared channel transmissions in a wireless communications system;
transmitting, before a threshold time, a first control channel associated with a first priority, the first control channel indicating a first set of time-frequency resources that occur after the threshold time, the first set of time-frequency resources allocated for a shared channel transmission for a user equipment (UE);
determining a second set of time-frequency resources that occur after the threshold time, the second set of time-frequency resources associated with a potential shared channel transmission that is currently unscheduled, the potential shared channel transmission corresponding to a second control channel to be potentially transmitted after the threshold time, the second control channel associated with a second priority based at least in part on the set of transmission parameters; and
transmitting at least one of the shared channel transmission over the first set of time-frequency resources or the potential shared channel transmission over the second set of time-frequency resources based at least in part on a set of priority rules for the first priority and the second priority, the set of priority rules applied before the threshold time for the potential shared channel transmission that is currently unscheduled.

18. The method of claim 17, further comprising:
determining a set of resource allocation schemes and a set of spatial transmission parameters for shared channel transmissions based at least in part on the set of transmission parameters.

19. The method of claim 18, further comprising:
determining a first set of spatial transmission parameters for the shared channel transmission based at least in part on the set of resource allocation schemes;
determining a second set of spatial transmission parameters for the potential shared channel transmission based at least in part on the set of resource allocation schemes; and
transmitting at least one of the shared channel transmission over the first set of time-frequency resources or the potential shared channel transmission over the second set of time-frequency resources based at least in part on the first and second sets of spatial transmission parameters.

20. The method of claim 18, further comprising:
receiving control information indicating information for scheduling the shared channel transmission.

21. The method of claim 18, further comprising:
transmitting the potential shared channel transmission over the second set of time-frequency resources, wherein the second priority is higher than the first priority.

22. The method of claim 21, further comprising:
dropping the shared channel transmission based at least in part on transmitting the potential shared channel transmission.

23. The method of claim 18, further comprising:
transmitting the shared channel transmission over the first set of time-frequency resources, wherein the first priority is higher than the second priority.

24. The method of claim 23, further comprising:
dropping the potential shared channel transmission based at least in part on transmitting the shared channel transmission.

25. The method of claim 18, further comprising:
transmitting both the shared channel transmission over the first set of time-frequency resources and the potential shared channel transmission over the second set of time-frequency resources based at least in part on a rate-matching scheme for the first priority and the second priority indicated by the set of priority rules.

26. The method of claim 18, wherein:
the first priority of the shared channel transmission is associated with a first traffic type or a first channel type based at least in part on the set of priority rules; and
the second priority of the potential shared channel transmission is associated with a second traffic type or a second channel type based at least in part on the set of priority rules.

27. The method of claim 17, further comprising:
transmitting, to the UE, an indication of the set of priority rules via radio resource control (RRC) signaling, downlink control information (DCI), or a media access control-control element (MAC-CE).

28. An apparatus for wireless communications, comprising:
a processor, memory in electronic communication with the processor; and
instructions stored in the memory and executable by the processor to cause the apparatus to:
identify a set of transmission parameters for shared channel transmissions in a wireless communications system;
receive, before a threshold time, a first control channel associated with a first priority, the first control channel indicating a first set of time-frequency resources that occur after the threshold time, the first set of time-frequency resources allocated for a shared channel transmission;
determine a second set of time-frequency resources that occur after the threshold time, the second set of time-frequency resources associated with a potential shared channel transmission that is currently unscheduled, the potential shared channel transmission corresponding to a second control channel to be monitored after the threshold time, the second control channel associated with a second priority based at least in part on the set of transmission parameters; and monitor for the shared channel transmission over the first set of time-frequency resources or the potential shared channel transmission over the second set of time-frequency resources based at least in part on a set of priority rules for the first priority and the second priority, the set of priority rules applied before the threshold time for the potential shared channel transmission that is currently unscheduled.

29. An apparatus for wireless communications, comprising:

a processor, memory in electronic communication with the processor; and instructions stored in the memory and executable by the processor to cause the apparatus to:

identify a set of transmission parameters for shared channel transmissions in a wireless communications system;

transmit, before a threshold time, a first control channel associated with a first priority, the first control channel indicating a first set of time-frequency resources that occur after the threshold time, the first set of time-frequency resources allocated for a shared channel transmission;

determine a second set of time-frequency resources that occur after the threshold time, the second set of time-frequency resources associated with a potential shared channel transmission that is currently unscheduled, the potential shared channel transmission corresponding to a second control channel to be potentially transmitted after the threshold time, the second control channel associated with a second priority based at least in part on the set of transmission parameters; and transmit at least one of the shared channel transmission over the first set of time-frequency resources or the potential shared channel transmission over the second set of time-frequency resources based at least in part on a set of priority rules for the first priority and the second priority, the set of priority rules applied before the threshold time for the potential shared channel transmission that is currently unscheduled.

\* \* \* \* \*